US012006755B2

United States Patent
Guevara Rosas et al.

(10) Patent No.: US 12,006,755 B2
(45) Date of Patent: Jun. 11, 2024

(54) AUTOMATIC DOOR WITH RADAR SENSING

(71) Applicant: Allegion Access Technologies LLC, Carmel, IN (US)

(72) Inventors: Jorge I. Guevara Rosas, Farmington, CT (US); Jonathan M. Braverman, West Hartford, CT (US); Anthony R. Ranaudo, Charlestown, RI (US); Pedro I. Iñigo Santiago, South Windsor, CT (US); Ethan F. Traineanu, Enfield, CT (US); Kyle N. Carissimi, East Hampton, CT (US); Christopher Conroy, South Windsor, CT (US)

(73) Assignee: ALLEGION ACCESS TECHNOLOGIES LLC, Carmel, IN (US)

( * ) Notice: Subject to any disclaimer, the term of this patent is extended or adjusted under 35 U.S.C. 154(b) by 146 days.

(21) Appl. No.: 17/658,562

(22) Filed: Apr. 8, 2022

(65) Prior Publication Data

US 2023/0323725 A1 Oct. 12, 2023

(51) Int. Cl.
  *E05F 15/43* (2015.01)
  *E05F 15/73* (2015.01)
  *G01S 13/02* (2006.01)

(52) U.S. Cl.
  CPC .............. *E05F 15/73* (2015.01); *G01S 13/02* (2013.01)

(58) Field of Classification Search
  CPC ........ E05F 15/43; E05F 15/73; G05B 19/416; G01S 13/02
  See application file for complete search history.

(56) References Cited

U.S. PATENT DOCUMENTS

| 4,823,010 A | 4/1989 | Kornbrekke et al. |
| 5,142,152 A | 8/1992 | Boiucaner |

(Continued)

FOREIGN PATENT DOCUMENTS

| CN | 110863733 A | 3/2020 |
| EP | 3026457 A1 | 6/2016 |

OTHER PUBLICATIONS

International Search Report and Written Opinion for PCT Application No. PCT/US2023/017470, dated Jul. 17, 2023, 29 pages.

(Continued)

*Primary Examiner* — Cortez M Cook
(74) *Attorney, Agent, or Firm* — Brake Hughes Bellermann LLP

(57) ABSTRACT

An automatic door can include a plurality of millimeter wave (mmW) sensors that are each configured to sense a door area. Each mmW sensor includes a mmW radar configured to capture mmW radar data and an inertial measurement unit (IMU) configured to measure an orientation of the mmW radar. Based on IMU data from the mmW sensors, the mmW radar data from the sensors can be combined so that the door areas can form a combined door area. Multiple targets can be detected and tracked through the combined door area at high resolutions and in a variety of environmental conditions. Control of the automatic door can be enhanced in a variety of ways by classifying the targets and predicting their movements in the combined door area. Further, the classification and prediction of targets can facilitate safe and reliable operation by filtering operation based on certain targets and/or motions.

22 Claims, 24 Drawing Sheets

(56) References Cited

U.S. PATENT DOCUMENTS

| | | | | |
|---|---|---|---|---|
| 6,304,178 | B1* | 10/2001 | Hayashida | E05F 15/43 340/552 |
| 6,756,910 | B2 | 6/2004 | Ohba et al. | |
| 7,042,492 | B2 | 5/2006 | Spinelli | |
| 7,940,300 | B2 | 5/2011 | Spinelli | |
| 2003/0122514 | A1 | 7/2003 | Mercier et al. | |
| 2019/0226265 | A1* | 7/2019 | Ahmad | G05B 19/416 |

OTHER PUBLICATIONS

"Automated Doors Reference Design Using TI mmWave Sensors", Design Guide: TIDEP-01018, Texas Instruments, Apr. 2020, 28 pages.

\* cited by examiner

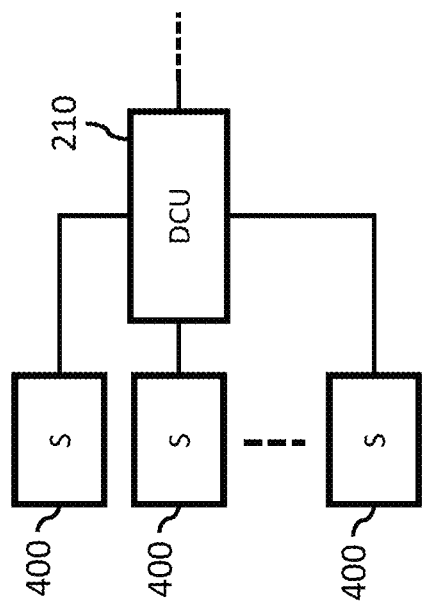

AUTOMATIC DOOR WITH RADAR SENSING

FIELD OF THE DISCLOSURE

The present disclosure relates to an automatic door system and more specifically, to an automatic door system that includes at least one radar sensor to sense a door area.

BACKGROUND

Business buildings often control physical access using an automatic door. The automatic door is configured to open and close based on measurements from one or more sensors at, or around, the automatic door. The automatic door opening and closing typically conforms to an industry standard for safety to prevent injury (e.g., by a door closing on a person). As a result, an automatic door may include a first sensor (i.e., activation sensor) configured to detect a person approaching (or leaving) a door and a second sensor (i.e., presence sensor) configured to detect when a person is at the door (e.g., in the doorway). The sensing capability of the automatic door is typically limited to detecting (i) a bidirectional movement (e.g., to/from doorway) and (ii) a presence (e.g., in the doorway). Additional sensing capabilities could enhance door control.

SUMMARY

In at least one aspect, the present disclosure generally describes an automatic door system. The automatic door system includes a door that is controllable to at least an open position and a closed position. The automatic door system further includes a plurality of radar sensors. Each radar sensor includes a millimeter wave (mmW) radar configured to generate mmW radar data corresponding to a door area. Each radar sensor further includes an inertial measurement unit (IMU) that is configured to generate IMU data corresponding to an orientation of the mmW radar with respect to a reference coordinate system. The automatic door system further includes a door control unit (DCU) that is communicatively coupled to the door assembly and the plurality of radar sensors. The DCU is configured (e.g., by software instructions) to control the door based on combined mmW radar data, which includes mmW radar data from each of the plurality of radar sensors.

In another aspect, the present disclosure generally describes a radar sensor for an automatic door, the radar sensor includes a mmW radar that is configured to generate mmW radar data corresponding to a door area. The radar sensor further includes an IMU that is configured to generate IMU data corresponding to an orientation of the mmW radar. The radar sensor further includes a sensor control unit (SCU) that is configured by software instructions to receive the mmW radar data and the IMU data; register the mmW radar data to a reference coordinate system; and transmit the registered mmW radar data to a DCU of the automatic door.

In another aspect, the present disclosure generally describes a method for controlling an automatic door. The method includes collecting first mmW radar data from a first mmW radar and collecting first IMU data, which corresponds to a first orientation of the first mmW radar, from a first IMU. The method further includes collecting second mmW radar data from a second mmW radar and collecting second IMU data, which corresponds to a second orientation of the second mmW radar, from a second IMU. The method further includes registering the first mmW radar data and the second mmW radar data to a reference coordinate system. The method further includes combining the first mmW radar data and the second mmW radar data to obtain combined mmW radar data. The method further includes analyzing the combined mmW radar data to track one or more targets in a combined door area, which corresponds to the combined mmW radar data, and controlling the automatic door based on the tracking of the one or more targets in the combined door area.

The foregoing illustrative summary, as well as other exemplary objectives and/or advantages of the disclosure, and the manner in which the same are accomplished, are further explained within the following detailed description and its accompanying drawings.

BRIEF DESCRIPTION OF THE DRAWINGS

FIGS. 4A-4C are communication configurations for the radar sensors and a door control unit according to possible implementations of the present disclosure.

The components in the drawings are not necessarily to scale relative to each other. Like reference numerals designate corresponding parts throughout the several views.

DETAILED DESCRIPTION

Figure 1:
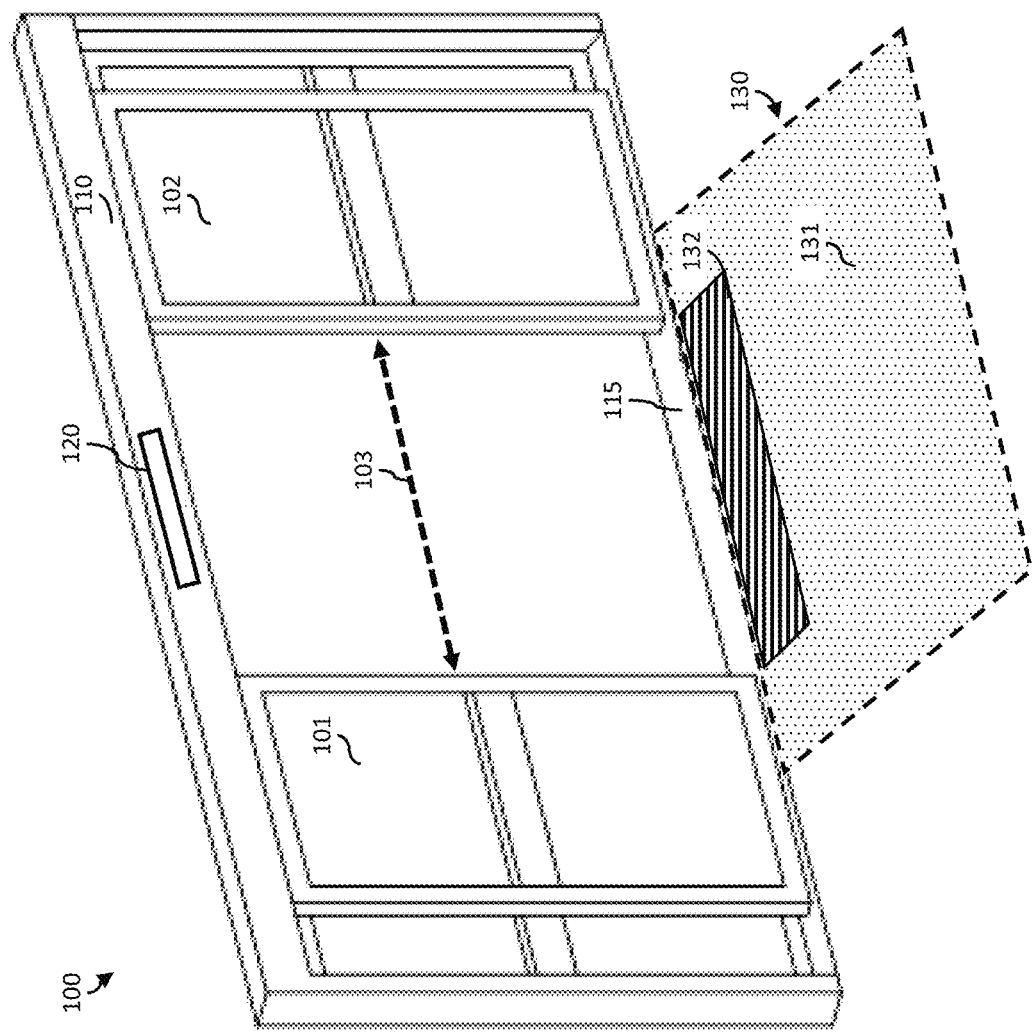
FIG. 1 is a perspective view of an automatic door according to a possible implementation of the present disclosure.

Conventionally, two sensors have functioned to activate the open/close function of an automatic door (i.e., activation sensor) and to prevent the automatic door from closing on an object or entity in the doorway (i.e., presence sensor). An object may be inanimate, such as the floor, a wall, or a piece of furniture, while an entity may be animate, such as a person, animal, or otherwise moving object. Objects and entities may be referred to generally as targets. For example, a microwave radar sensor may be configured to detect motion of a target in an activation zone of a door area. While a conventional microwave radar sensor may be configured to determine if a movement is towards the door or away from the door, it may not be configured to detect other directions of movements, differentiate between multiple movements, or detect stationary objects/people. For example, the microwave radar sensor may not be able to detect when a customer stands motionless in the doorway. As result, most conventional doors utilize an infrared (IR) sensor that can detect the presence of a person or object in a presence zone (i.e., safe zone) aligned with the doorway even when the person is motionless. The IR sensor, however, may not be sensitive enough to differentiate between stationary objects and stationary people. Further, the IR presence sensor is not configured to provide any understanding of where an object/person is located other than within a presence zone of a door area. Automatic door control could be greatly enhanced if the sensors were more sensitive and/or could gather more information.

An automatic door may use a video camera as the sensor for door operation. A video camera can be configured to capture video in the door area at the automatic door, and image processing may be applied to the captured video in order detect motion and presence for door operation. This image approach to door control, however, has technical problems. For example, reduced light and/or direct/reflected sunlight can reduce image quality, which can affect the image processing necessary for door control. Further, weather conditions (e.g., fog, snow, rain) can also affect image quality in exterior installations. Accordingly, a video camera may not be practical for some door installations. Further, the resolution of the video camera may not be fine enough to capture small movements and therefor can lack sensitivity. For example, there may be risk of classifying a stationary person as a stationary object. Thus, a need exists for a door sensor that can facilitate the detection, classification, and tracking of multiple targets in a door area that is also versatile enough to be used in various environmental conditions.

To address at least the technical problems presented above, the present disclosure describes an automatic door system (i.e., automatic door) that includes a millimeter wave (mmW) radar sensor (or sensors) that can provide data to detect, classify, and track multiple targets in a door area in various environmental conditions. Millimeter wave (mmW), as described herein, includes any frequency of the electromagnetic spectrum having a wavelength that is on the order of a millimeter (e.g., 1 mm≤λ≤10 mm). For example, any frequency in a range of approximately 30 gigahertz (GHz) to approximately 300 GHz can be used for millimeter wave radar sensing. The disclosure recognizes that some advantages may be achieved by sensing frequencies higher than conventional door microwave radar sensors, which may have less resolution than mmW radar sensors, and door optical sensors, which can be affected more by environmental conditions than mmW radar sensors. In particular, mmW radar sensors may operate in a portion of the electromagnetic spectrum ranging from approximately 40 GHz to approximately 75 GHz (i.e., V band), with a frequency (or frequencies) around 60 GHz (e.g., 60 GHz≤f≤64 GHz) being possible for the implementations described herein.

Millimeter wave radar can measure position and velocity information at very high resolutions. Accordingly, multiple objects/entities in a door area can be detected simultaneously, and stationary objects may be determined as living based on subtle movements (e.g., breathing). Further, mmW radar is immune to lighting conditions and environmental conditions that negatively affect video (i.e., vision) sensors. Data (e.g., position, velocity) collected by a mmW radars can be processed to classify, track, and predict movement for multiple targets in a door area, which can enhance door control in a variety of ways.

FIG. 1 is a perspective view of an automatic door assembly (i.e., automatic door 100) according to a possible implementation of the present disclosure. The automatic door 100 shown in FIG. 1 is a sliding automatic door in which a left panel 101 and a right panel 102 are configured to slide apart to form a door opening 103. While the principles of the present disclosure may be applied to other door types (e.g., swinging doors, folding doors, etc.), the sliding door type will be discussed in detail. In an open position the left panel 101 may overlap a left stationary panel and the right panel 102 may overlap a right stationary panel. The left panel 101 and the right panel 102 may be guided and supported in movement by a door frame that surrounds and supports the door panels. The door frame may include a door header (i.e., header 110) that is located above the door panels and a threshold 115 that is located at the floor of the door opening 103. The door panels may be mechanically coupled to the header 110 (e.g., via a track) so that they can move along the header in order to open and close. The header 110 may further support and contain a door sensor system (i.e., sensor system 120).

The sensor system 120 may include one or more sensors that are configured to sense a door area 130. The door area 130 may be divided into zones based on the resulting door operation caused by an object/entity (i.e., target) detected in the zone. For example, the door area 130 may include an activation zone 131 (i.e., shown as dotted) and a presence zone 132 (i.e., shown as hashed). Sensing a movement of an entity (e.g., approaching the door) in the activation zone 131 may trigger the automatic door to perform an open/close sequence and sensing an object/entity in the presence zone 132 may open the door (e.g., open a closing door) or suspend an open door from closing.

An advantage of the disclosed mmW radar sensor system approach is that the zones are all sensed using the same technology, as opposed to different sensor types for different zones. Accordingly, each zone's size, shape, and location may be changed (e.g., by software/firmware) without adjustment to the sensor system. Additionally, new zones may be added and/or existing zones may be removed. For example, a living-object zone may be designated in the door area 130 to help tracking and classification. In other words, the disclosed automatic door includes configurable zones for door control. Accordingly, it may be understood that the door area 130 and zones shown in FIG. 1 are not limiting to the disclosed invention.

Another advantage of the disclosed mmW radar sensor system approach is that multiple mmW radar sensors may be used to extend and/or reshape the door area 130. For example, the use of multiple mmW radar sensors can extend the presence zone 132 over the threshold 115 and/or expand the activation zone 131 so that a width of the activation zone 131 matches or exceeds the width of the automatic door 100. In other words, the disclosed automatic door system has a combined door area corresponding to the coverage of multiple mmW radar sensors in a door sensor system, where the combined door area is larger than a door area that could be sensed by any one of the multiple mmW radar sensors alone.

The door area 130 may be located on the interior or the exterior of a building, room, or hallway that is accessed by the automatic door 100. In some implementations, the automatic door 100 may include an interior sensor system to sense an interior door area and an exterior sensor system to sense an exterior door area. The interior sensor system and the exterior sensor system can operate identically. Accordingly, the present disclosure will discuss one sensor system for the automatic door, but it should be understood that the principles of the disclosure can be adapted to automatic doors with multiple sensor systems, such as described for interior and exterior.

Figure 2:
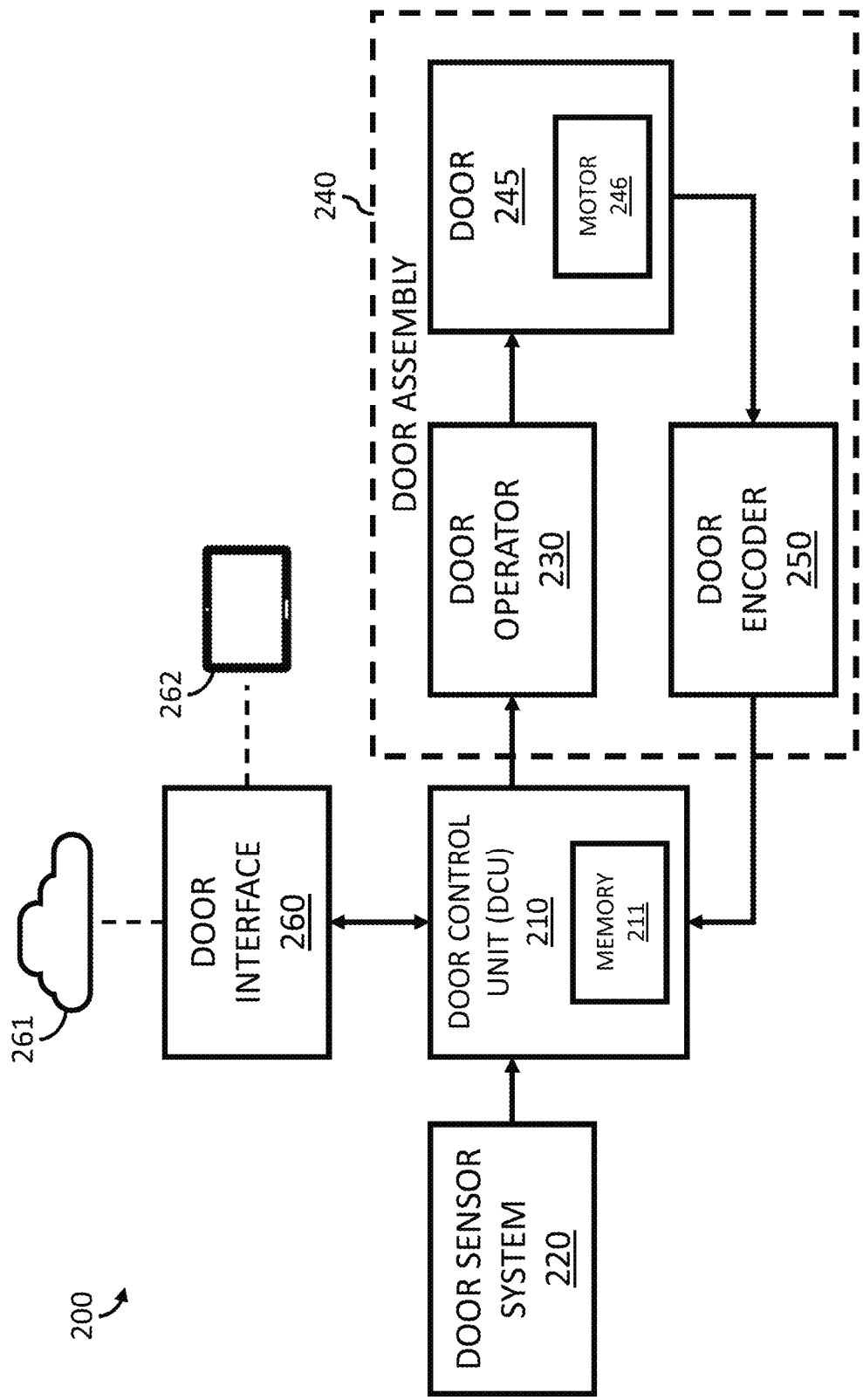
FIG. 2 is a block diagram of an automatic door system according to a possible implementation of the present disclosure.

FIG. 2 is a block diagram of an automatic door system according to a possible implementation of the present disclosure. The automatic door system 200 includes a door control unit (i.e., DCU 210). The DCU can function as a central processor for the automatic door system. Accordingly, the DCU 210 may include one or more processors, controllers, etc. that can be configured by software instructions (e.g., programs) to generate the signals necessary to control the various subsystems in the automatic door. The DCU 210 may include a memory 211 (e.g., non-transitory computer readable memory (CRM)) for storage of the software instructions and data collected by the door system. The DCU 210 may be physically housed with (e.g., within) the door frame and can be communicatively coupled in a wired or wireless fashion, to the other subcomponents and subsystems for the automatic door system. For example, the door control unit may be coupled to a door interface module (i.e., door interface 260) for communication with other doors, devices, and/or networks.

The door interface 260 may include processing and communication circuitry to enable the DCU 210 to communicate with a network 261 (e.g., internet) or a computing device 262 (e.g., tablet computer). For example, a technician operating the computing device 262 may access the automatic door via communication with the door interface using a wireless communication protocol (e.g., Bluetooth). This access may be used to test, calibrate, or otherwise operate the subsystems of the automatic door system. For security, the door interface 260 can include physical or software security components to prevent unwanted access. In a possible implementation, the DCU 210 may store data collected by the automatic door system 200 and may transmit the data, or messages related to the data, to another computer coupled to the automatic door system 200 via the network 261 (e.g., cloud). In another possible implementation, the processing of the DCU 210 may be supplemented or replaced by a processor, or processors, coupled to the automatic door system via the door interface 260. For example, analysis of door sensor data may be carried out using a cloud computing approach. In another possible implementation, the door interface 260 may be configured to communicate with other automatic door systems. For example, it may be possible for classification from a first door to be shared with a second door to aid in tracking an entity. The door interface may communicate wirelessly via a variety of wireless technologies, including (but not limited to) WiFi, 4G/5G wireless, Bluetooth, and ultra-wideband (UWB).

The automatic door system 200 further includes a door sensor system 220. As discussed, the door sensor system 220 can include one or more mmW radar sensors (i.e., mmW sensors, radar sensors) configured to transmit an electromagnetic signal in a millimeter wave frequency band (e.g., 60-64 Gigahertz (GHz)) into door areas and to receive reflected electromagnetic signals back from objects/entities in the door areas. Based on these reflected signals, the one or more radar sensors can detect objects/entities and their movement. For example, each radar sensor may generate mmW radar data (i.e., radar data) that corresponds to the targets (i.e., entities/objects) measured in its door area (i.e., in its field-of-view).

The automatic door system 200 further includes a door assembly 240. The door assembly 240 can include an automatic door (i.e., door 245). The door 245 can be one of a variety of types including (but not limited to) sliding, folding, and swinging and can include both moving and non-moving door panels. The door 245 can be configured by a door motor (i.e., motor 246), or other device configured to apply hydraulic or electromechanical force, into an open position, a closed position, or one or more positions therebetween (i.e., partially open). The door 245 may be mounted to door panel carriers that slide or roll in the header 110 to open/close. The door assembly 240 can further include a door operator 230. The door operator 230 can include a controller and circuitry to drive the motor 246 based on signals from the DCU 210. The door assembly 240 can further include a door encoder 250 that is coupled to the door and configured to measure the position of the door. The measured position of the door can be fed back to the DCU 210 to provide a closed loop control of the door 245.

Figure 3:
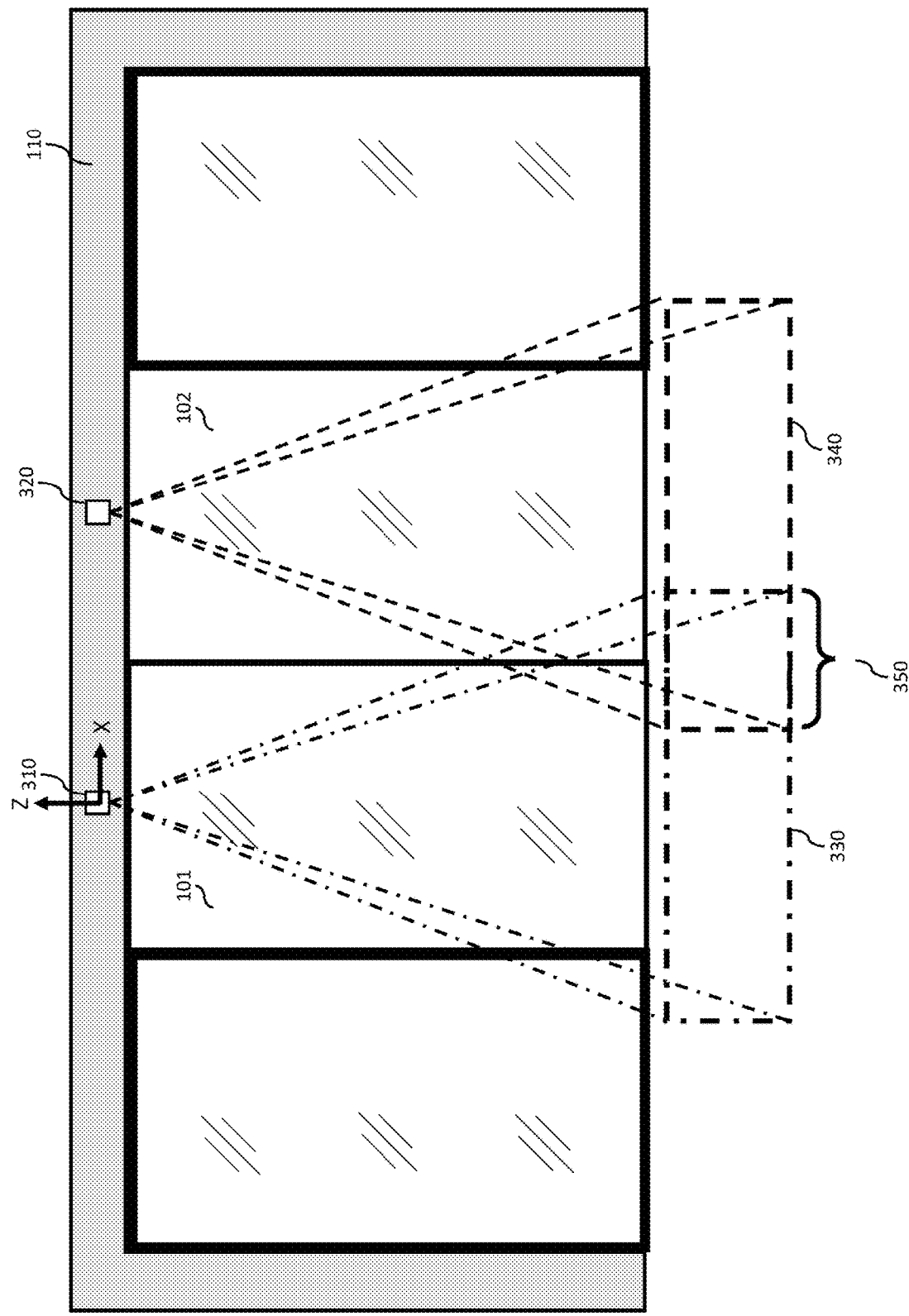
FIG. 3 is a perspective view of an automatic door including two radar sensors according to a possible implementation of the present disclosure.

FIG. 3 is a perspective view of an automatic door system including a sliding door assembly and a door sensor system having two radar sensors according to one possible implementation of the present disclosure. A first radar sensor 310 is mechanically coupled to the header 110 of the door assembly above the left panel 101, and a second radar sensor 320 is mechanically coupled to the header 110 of the door assembly above the right panel 102. Each radar sensor has a field of view in which targets may be detected. The radar sensors are positioned so that a first field of view of the first radar sensor 310 defines a first door area 330 and a second field of view of the second radar sensor 320 defines a second door area 340. The door areas are in front of the automatic door. While the fields of view are shown as rectangular, it may be understood that the door areas can be any shape and may not match in shape or area. The first door area 330 and the second door area 340 can overlap in an overlap region 350. A target in the overlap region is detected by each radar sensor. Each radar sensor is configured to capture radar data based on a coordinate system defined by the radar sensor. For example, a target located in the overlap region may appear in a left or right portion of the field of view depending on the radar sensor. The radar data from each radar sensor can be combined when the relative position/orientation of the radar sensors is known. For example, as shown in FIG. 3, the second radar sensor 320 is spatially offset from the first radar sensor in the X-direction of the coordinate system (X, Z) of the first radar sensor 310. If this offset is known, the radar data from the second radar sensor 320 can be registered to the coordinate system of the first radar sensor 310. The radar data can then be combined so that the radar data from the two sensors forms a combined door area that is the union of the first door area 330 and the second door area 340.

Figure 4B:
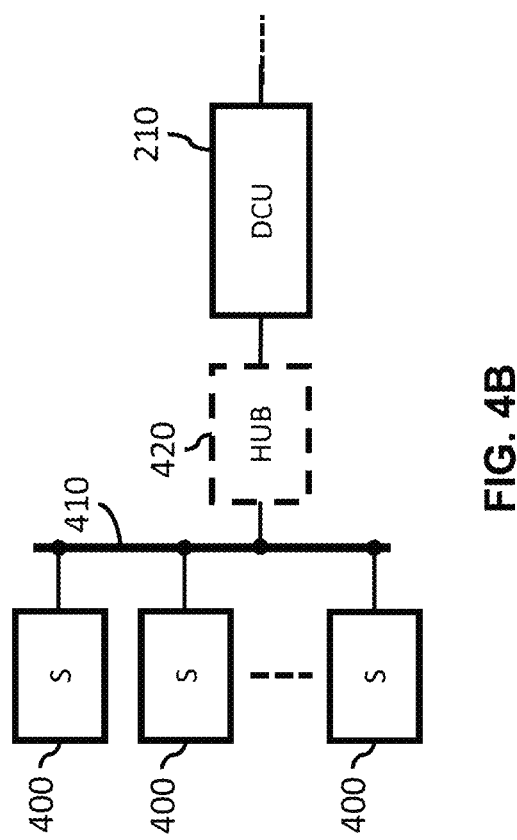
Figure 4C:
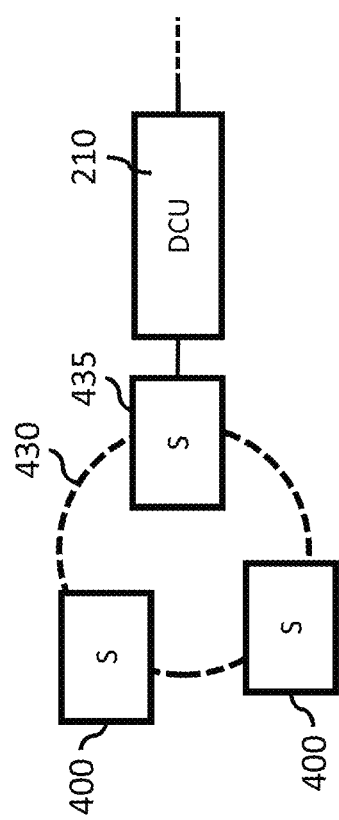

The implementation shown in FIG. 3 includes two radar sensors. In general, the door sensor system may include any number of radar sensors. A plurality of radar sensors can communicate with each other and/or with the DCU 210 in a variety of ways. FIGS. 4A-4C are block diagrams showing various communication configurations for the plurality of radar sensors. FIG. 4A illustrates a first communication configuration in which each radar sensor 400 (i.e., S) communicates directly with the DCU 210. The direct communication configuration may eliminate the need for a communication protocol to communicate on a common channel (i.e., bus) but may add complexity to the DCU. FIG. 4B illustrates a second communication configuration in which each radar sensor 400 and the DCU 210 communicates to share information over a bus 410. In some implementations, the DCU 210 may require a hub 420 to communicate with the bus 410. FIG. 4C illustrates a third communication configuration in which the radar sensors form a sensor network 430 to share information between each radar sensor 400. One of the radar sensors can be designated/configured as the master sensor 435. The master sensor 435 can be configured to manage the communication on the sensor network. Additionally, the master sensor 435 may function as an interface with the DCU 210. The sensor network 430 can be wired or wireless.

Figure 5:
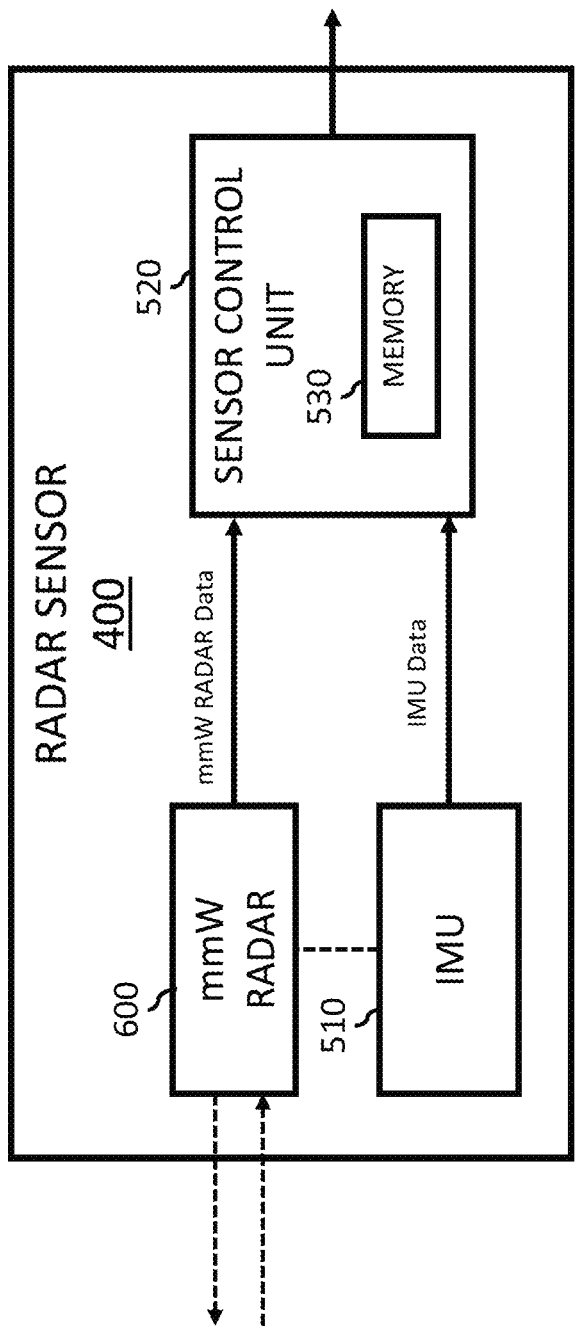
FIG. 5 is a block diagram of a radar sensor according to a possible implementation of the present disclosure.

FIG. 5 is a block diagram of a radar sensor according to a possible implementation of the present disclosure. The radar sensor 400 includes a mmW radar module (i.e., mmW radar 600). The mmW radar 600 is configured to detect a position in one, two, or three dimensions (e.g., spherical position, cartesian position) of a target and the movement (e.g., path, velocity, acceleration) of the target.

The radar sensor 400 further includes an inertial measurement unit (i.e., IMU 510). The IMU 510 includes a combination of sensors to measure the orientation of the IMU (e.g., with respect to the earth). The combination of sensors can include accelerometers, a gravitometer, gyroscopes, and/or a magnetometer. The IMU is mechanically coupled (to the mmW radar 600 so that IMU data returned by the IMU 510 corresponds to the orientation of the mmW radar 600.

The radar sensor 400 further includes a sensor control unit (SCU 520). The SCU 520 can be configured to communicate radar data and IMU data with the DCU and/or with other sensors, as described above. In a possible implementation, the SCU 520 can be configured to determine the orientation of the mmW radar from the IMU data and register the mmW radar data based on the determined orientation. The SCU 520 may include memory 530 on which to store (e.g., buffer) radar/IMU data and/or software for radar/IMU data processing.

Figure 6:
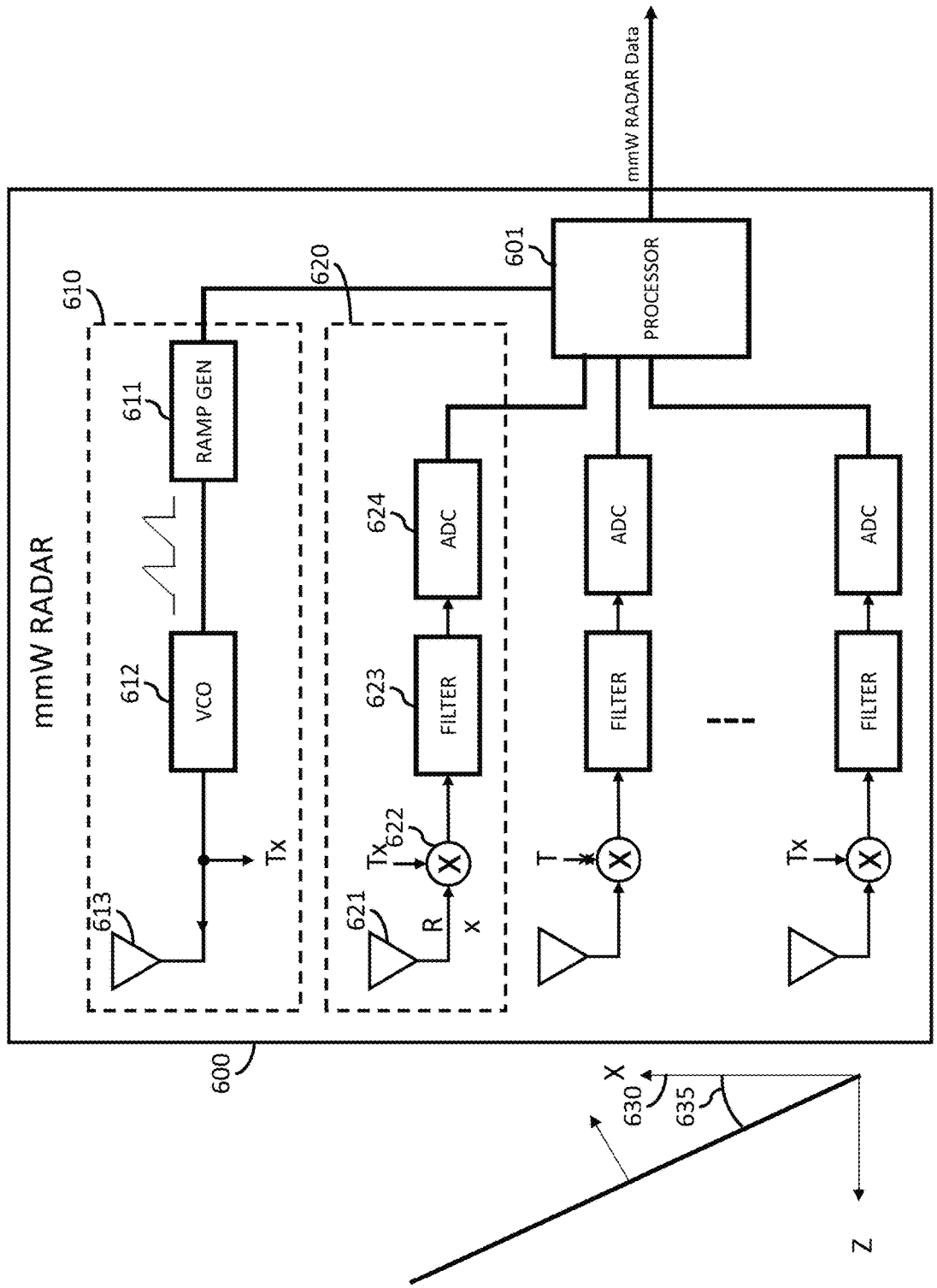
FIG. 6 is a block diagram of a mmW radar according to a possible implementation of the present disclosure.

FIG. 6 is a block diagram of a mmW radar according to a possible implementation of the present disclosure. The mmW radar 600 includes a processor 601 that is coupled to a transmitter 610 and a receiver 620. The mmW radar 600 may include multiple receivers in order to determine a direction of a target based on a phase difference between signals received at each antenna 621 of the receivers. The multiple receivers may be arrayed in two-dimensions in order to determine a phase shift in a first dimension and a phase shift in a second dimension. The two dimensions may correspond to two angles that define a target's position in two dimensions, which can be combined with range to locate the target in three dimensions. A resolution of an angle (i.e., angular resolution) in a particular dimension may correspond to the number of receivers in the particular dimension.

The configuration shown in FIG. 6 includes a single transmitter and a plurality of receivers (i.e., receiver array) spaced (e.g., equally spaced) along a direction of the receiver array. This configuration is known as a single-input-multiple-output (SIMO) radar. It is also possible to have a multiple-input-multiple-output (MIMO) radar that includes multiple transmitters. MIMO antennas may accomplish higher angular resolutions with fewer receiver modules. The principles of the present disclosure can be applied to either of these configurations. For the purposes of explanation, the SIMO configuration shown in FIG. 6 will be discussed in detail.

The transmitter 610 includes a synthesizer to produce a transmit signal (i.e., Tx) that changes frequency over time according to a ramp profile. For example, the transmitter 610 can include a ramp generator 611 to repeatedly generate a voltage that steadily increases (or decreases) with time for a period. The changing (i.e., ramp) voltage may then be coupled to an input of a voltage-controlled oscillator (i.e., VCO 612) or other oscillator that has a mmW frequency that is proportional to the input voltage. The resulting frequency modulated (i.e., chirped) transmit signal (i.e., Tx) is then coupled to a field of view via a transmit antenna 613. The mmW can be referred to as a frequency modulated continuous wave (FMCW) radar.

Each receiver 620 of the mmW radar 600 includes an antenna 621 configured to receive signals reflected from an object in the field of view. A range to an object can cause a delay between the transmitted signal (i.e., Tx) and the received signal (i.e., Rx), which for a chirped signal, corresponds to a frequency difference. As a result, the processor 601 of the mmW radar 600 can estimate distance to a target (i.e., range) based on the frequency difference between the transmitted signal and the received signal. Accordingly, each receiver of the mmW radar 600 further includes a mixer 622 configured to determine the frequency difference between the received signal (Rx) and the transmit signal (Tx). Each receiver may further include a filter 623 (e.g., low-pass filter, band-pass filter). The filter may help to isolate an intermediate frequency (i.e., IF) signal from harmonics resulting from the mixing process. The IF signal can include multiple tones, where the frequency of each tone is proportional to the distance (i.e., range) of a corresponding target (i.e., object). Each receiver may further include an analog to digital converter (i.e., ADC 624) that is configured to digitize the IF signal. The digitized signal may then be coupled to the processor 601 where it can be processed (e.g., transformed) in order to generate the mmW radar data which includes the range information to each target. For example, a Fourier transform (e.g., fast Fourier transform (FFT)) may be performed on the ADC data to obtain a frequency domain representation (i.e., spectrum) of the IF signal. The peaks of the spectrum can correspond to the range of the objects. Accordingly, the processor may be configured to identify range of each target based on peak detection of a spectrum. The mmW radar data may include a range to an object in the field of view.

The mmW radar data may further include an angle 635 of the received signal from the object with respect to the mmW radar. A coordinate system 630 of the mmW radar may be based on a direction of the antenna array of the receiver and the angle 635 may be relative to an axis of the coordinate system. Because of the angle 635, the received signal at each of the receivers will be shifted in phase with respect to each other. In other words, the range from the object to each of the receiver antennas is slightly different. To determine the angle, the processor 601 may be configured to determine the phase of corresponding spectral peaks at each receiver to determine the phase shifts between antennas. In other words, the processor may be configured to determine how a phase of a spectral peak changes over position to determine a spatial phase shift. The processor 601 may then be configured to relate the spatial phase shift to an angle to the target.

The processor 601 may be further configured to combine the range and the angle of mmW radar data to determine the position (i.e., location) of an object in the field of view (i.e., door area). When multiple objects/entities are in the field of view the processor 601 may be configured to determine positions of each. Multiple object positions may be resolved based on the angular resolution of the mmW radar. The angular resolution can correspond to the number of transmitters/receivers in the mmW radar.

The mmW radar data may further include a velocity measured for a moving object in the field of view. In order to measure velocity (i.e., speed), the processor 601 may be configured to estimate how the phase shift of a spectral peak changes over time. In other words, the processor may be configured to determine how a phase of a spectral peak changes over time to determine a temporal phase shift. The temporal phase shift may correspond to the velocity. Objects at the same range (i.e., having the same spectral peak) can be resolved using a frame of chirp signals and then performing a second transform (i.e., doppler-FFT) to resolve the objects by peaks corresponding to their different temporal phase shifts (i.e., velocity).

Figure 7B:
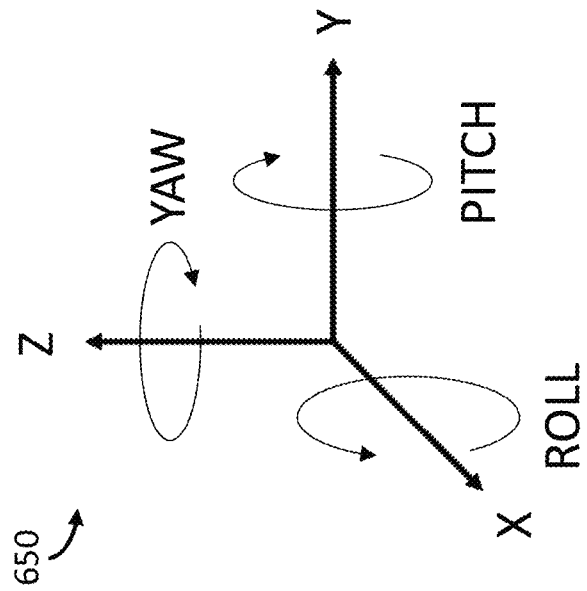
FIG. 7B illustrates possible transformations for a coordinate system of a radar sensor according to a possible implementation of the present disclosure.
Figure 7A:
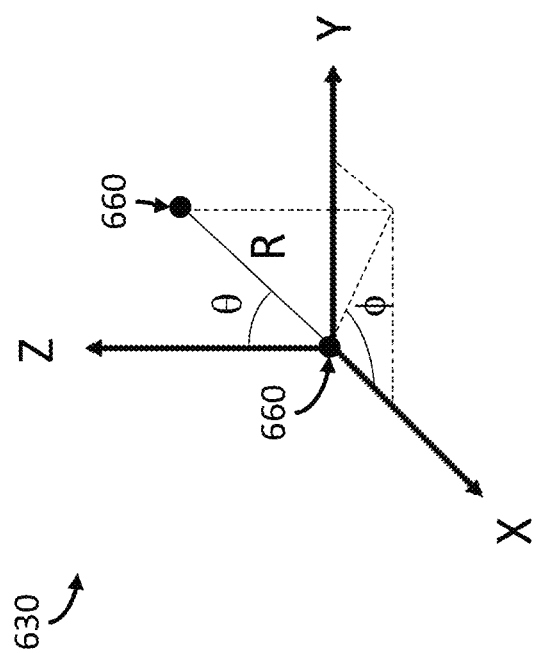
FIG. 7A illustrates details of a coordinate system for a radar sensor according to a possible implementation of the present disclosure.

FIG. 7A illustrates the coordinate system 630 of a mmW radar. An object (i.e., target) may be located in space based on the coordinate system 630, which can be physically centered at the mmW radar 600 and aligned with the physical axes of the mmW radar 600. Accordingly, the mmW radar data may include the position of a target 660 expressed in three dimensions. For example, a position of the target relative to the mmW radar may be expressed as a radial dimension (i.e., R), an azimuthal angle (i.e., φ)), and an elevation angle (i.e., θ). Alternatively, the position of the target 660 may be represented (e.g., converted from spherical coordinates) as cartesian coordinates (X, Y, Z). In some implementations, position of the target 660 may be used to determine (i.e., mapped to) a position in a door area and/or to a zone in the door area. In some implementations, the position of the target 660 may be used to determine a height of the object off the floor. For example, a first range to the floor may be computed and a first range to the object may be computed and a height of the object may be computed based on a difference between the first and second range.

Each mmW radar may generate mmW radar data based on a coordinate system corresponding to the mmW radar. In other words, each mmW radar may generate mmW radar data relative to its own coordinate system. In an automatic door system, it may be desirable to use multiple mmW radars to expand a sensed area. Each coordinate system of the multiple mmW radars may be different. To compared and/or combined mmW radar data from different mmW radars, it may be necessary to convert the mmW radar data from the mmW radars to a common (i.e., reference) coordinate system. For example, mmW radar data from each mmW radar may be converted to a reference coordinate system (e.g., corresponding to the door). In another possible implementation mmW radar data from a first mmW radar may be converted to the coordinate system of a second mmW radar. Comparing and/or combining mmW radar data from multiple mmW radars may include a coordinate transformation (i.e., conversion) of the mmW radar data to a common (i.e., reference) coordinate system. The converted mmW radar data may be referred to as registered mmW radar data.

FIG. 7B illustrates how coordinate systems can be compared for a coordinate conversion. A transformation between a first coordinate system 650 and a second coordinate system may include as a rotation about the first coordinate system z-direction (i.e., yaw), a rotation about the first coordinate system's y-direction (i.e., pitch), and a rotation about the first coordinate system's x-direction (i.e., roll). In other words, if a yaw, pitch, and roll of a coordinate system relative to a reference coordinate system is known, then the data related to range, angles, and positions of the coordinate system may be transformed (i.e., converted) to the reference coordinate system. Accordingly, a conversion may include determining a yaw, a pitch, and a roll between first coordinate system and a second coordinate system. Because IMU data corresponds to a coordinate system, the conversion between radar sensors may include determining a yaw, a pitch, and a roll based on a comparison of IMU data from the radar sensors. For example, a first IMU data from a first radar sensor and a second IMU data from a second radar sensor may be compared to determine a conversion necessary to register the mmW radar data from the first radar sensor. In this case, the position of one of the radar sensors may be the reference coordinate system. In some cases, additional information is necessary for a conversion. For example, a reference coordinate system may be aligned with the door and a conversion may require the details of the door as they relate to the reference coordinate system. Further, a conversion may include determining an offset between coordinate systems. For example, an offset may correspond to a spatial separation of radar sensors in the door frame.

Returning to FIG. 5, each radar sensor may include an IMU that is mechanically coupled to the mmW radar 600. The IMU is configured to generate IMU data based on the orientation of the mmW radar relative to a reference coordinate system. The reference coordinate system may be an earth coordinate system, a door coordinate system or a coordinate system of another mmW radar. The SCU 520 may include a processor that can be configured to receive the mmW radar data and the IMU data and to convert the mmW radar data to the reference coordinate system based on the IMU data. The conversion may also include knowledge of a physical layout. In other words, registering the mmW radar may require knowledge of both orientation and position (i.e., location) relative to a reference coordinate system.

Figure 8:
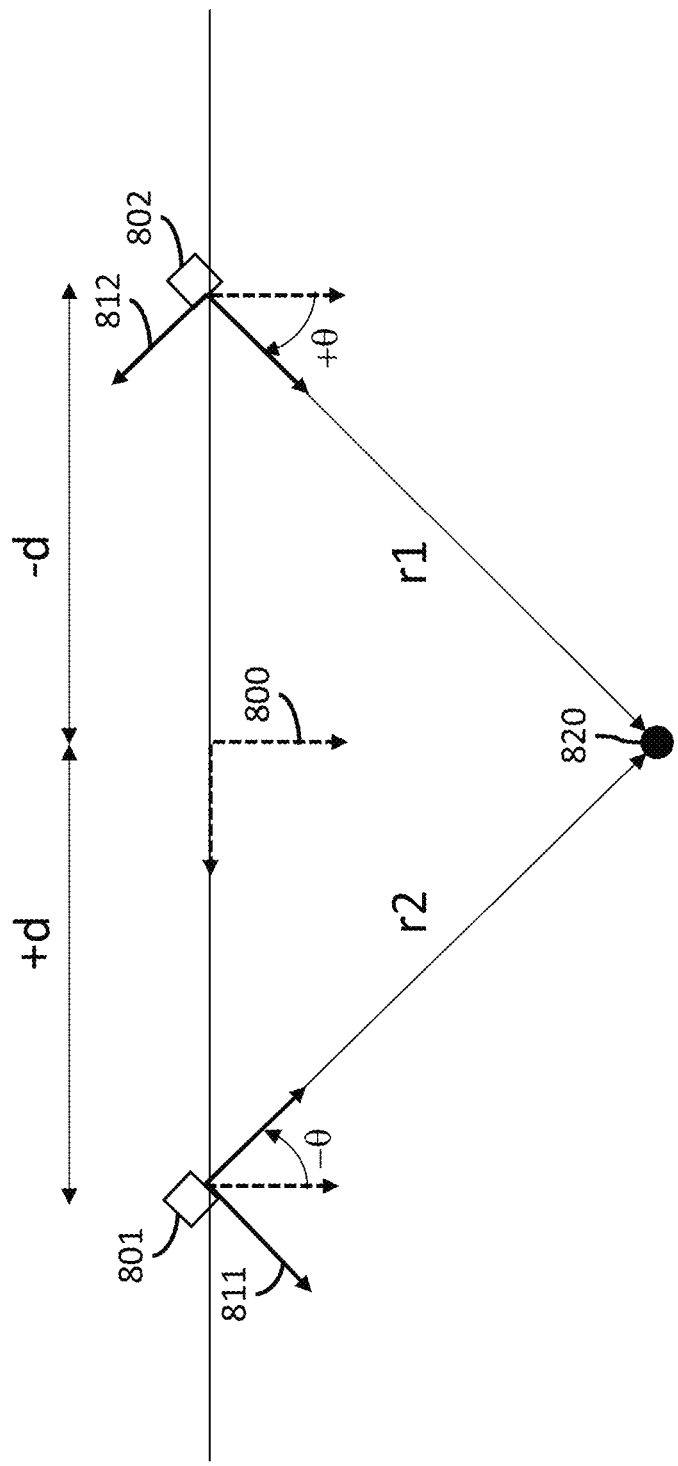
FIG. 8 is a block diagram illustrating spatial relationships between mmW radars for an automatic door system according to a possible implementation of the present disclosure.

FIG. 8 illustrates a possible physical layout of a first mmW radar 801 and a second mmW radar 802. Each mmW radar has its own local coordinate system. Each local coordinate system is rotated relative to a reference coordinate system 800. In particular, a first coordinate system 811 for the first mmW radar 801 is rotated $-\theta$ with respect to the reference coordinate system 800 and a second coordinate system 812 is rotate $+\theta$ with respect to the reference coordinate system 800. In addition, each mmW is offset relative to the reference coordinate system. In particular, the first coordinate system 811 is offset +d with respect to the reference coordinate system 800 and the second coordinate system 812 is offset −d with respect to the reference coordinate system (i.e., the second coordinate system 812). The offset may be determined by the frame of the door without the need for active (e.g., IMU) measurement. When relative orientation and location of the mmW radars is known, then a position of an object 820 may be determined with respect to any of the coordinate systems based on data from either the first mmW radar 801 or the second mmW radar. The reference coordinate system may be a coordinate system of the door or a coordinate system of one of the mmW radars.

When mmW radar data is converted to the reference coordinate system (i.e., common coordinate system) it is said to be registered. For example, mmW radar data from a first mmW may be registered to a door coordinate system and mmW data from a second mmW radar may be registered to the door coordinate system. The registered mmW radar data can be combined to formed combined radar data. The combined radar data can be analyzed to locate a target in a combined door area.

Registering first mmW radar data (from a first mmW radar) and second mmW radar data (from a second mmW radar) to a reference coordinate system can include determining a first coordinate conversion between a first coordinate system (of the first mmW radar) and the reference coordinate system and a second coordinate conversion between a second coordinate system (of the second mmW radar) and the reference coordinate system. Next, the first mmW radar data may be modified according to the first coordinate conversion to obtain registered first mmW radar data, and the second mmW radar data may be modified according to the second coordinate conversion to obtain registered second mmW radar data. The registered first mmW radar data and the registered second mmW radar data can then be combined to obtain combined mmW radar data.

The reference coordinate system may be selected variously. In a possible implementation the reference coordinate system is a coordinate system aligned with the physical shape of the automatic door. For example, a horizontal axis (e.g., x-axis) of a reference coordinate system can be in a direction along which the door panels open and close (i.e., door opening 103), and a vertical axis (e.g., y-axis) of the reference coordinate system can be along a direction from the threshold 115 to the header 110 of the sliding door. In another possible implementation, the reference coordinate system is a coordinate system of one of the mmW radars (e.g., the master sensor). In this implementation, mmW radar data from other radar sensors are converted to the coordinate system of the master sensor. This conversion may be aided by communication of IMU data amongst radar sensors.

Figure 9:
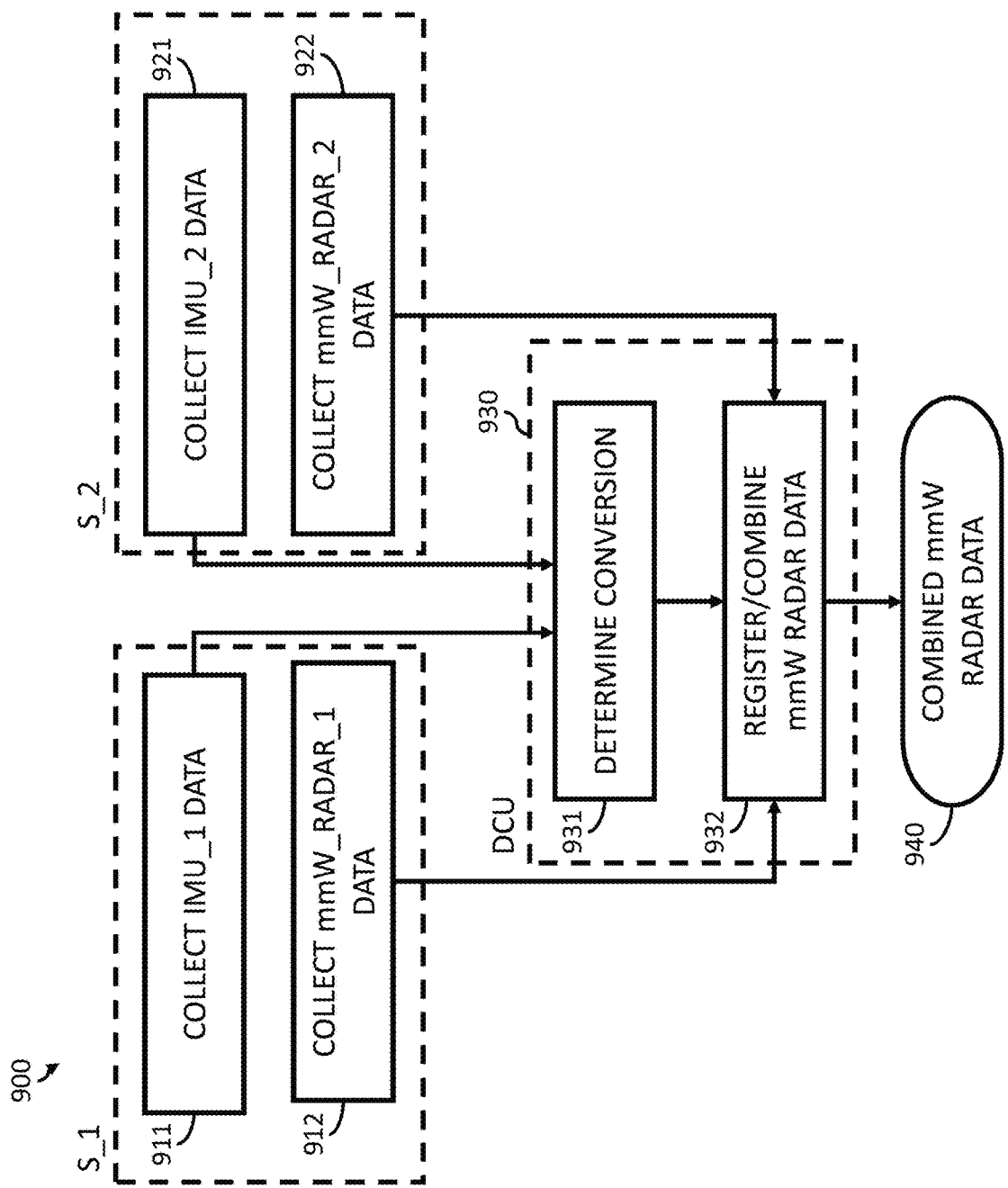
FIG. 9 is a flowchart of a method for generating combined mmW radar data according to a first possible implementation of the present disclosure.

FIG. 9 is a flowchart of a method for generating combined mmW radar data 940 according to a first possible implementation of the present disclosure. The implementation shown can be for a door sensor system of an automatic door system that includes (i) a first radar sensor (i.e., S_1) including a first IMU (i.e., IMU_1), a first mmW radar (i.e., mmW_radar_1) and a first sensor control unit (i.e., SCU_1) and (ii) a second radar sensor (i.e., S_2) including a second IMU (i.e., IMU_2), a second mmW radar (i.e., mmW radar_2) and a second sensor control unit (i.e., SCU_2). The dual radar sensor implementation is presented for simplicity, but the method could be expanded to include any number of radar sensors.

The method 900 includes collecting 911, at the first radar sensor (S_1), IMU data using IMU_1 and collecting 912 mmW radar data using mmW_radar_1. The method 900 further includes collecting 921, at the second radar sensor (S_2), IMU data using IMU_2 and collecting 922 mmW radar data using mmW_radar_2. The data from each IMU and each mmW radar is then communicated to a door control unit (i.e., DCU) of the automatic door system. For example, SCU_1 and SCU_2 may each be configured to communicate the data over one of the topologies described previously (see FIGS. 4A-4C).

The method 900 further includes determining 931 a conversion for the radar data (e.g., range, angle, position, velocity) based on the IMU_1 data and the IMU_2 data. For example, the DCU 930 may be configured to receive the IMU data, determine the relative orientation and positions of S_1 and S_2 based on the IMU data, and determine the data conversion based on the relative orientations and positions. Based on the determined conversion, the method 900 then includes registering 932 the mmW radar data to a common coordinate system. For example, the DCU may be configured to register the mmW radar data to a reference coordinate system (e.g., automatic door coordinate system) and combine the mmW radar data into combined mmW radar data 940. This method 900 for generating the combined mmW radar data may have the advantage of performing more complex algorithms for data registration at the DCU which can centralize the processing requirements, which may provide cost, complexity and power savings.

Figure 10:
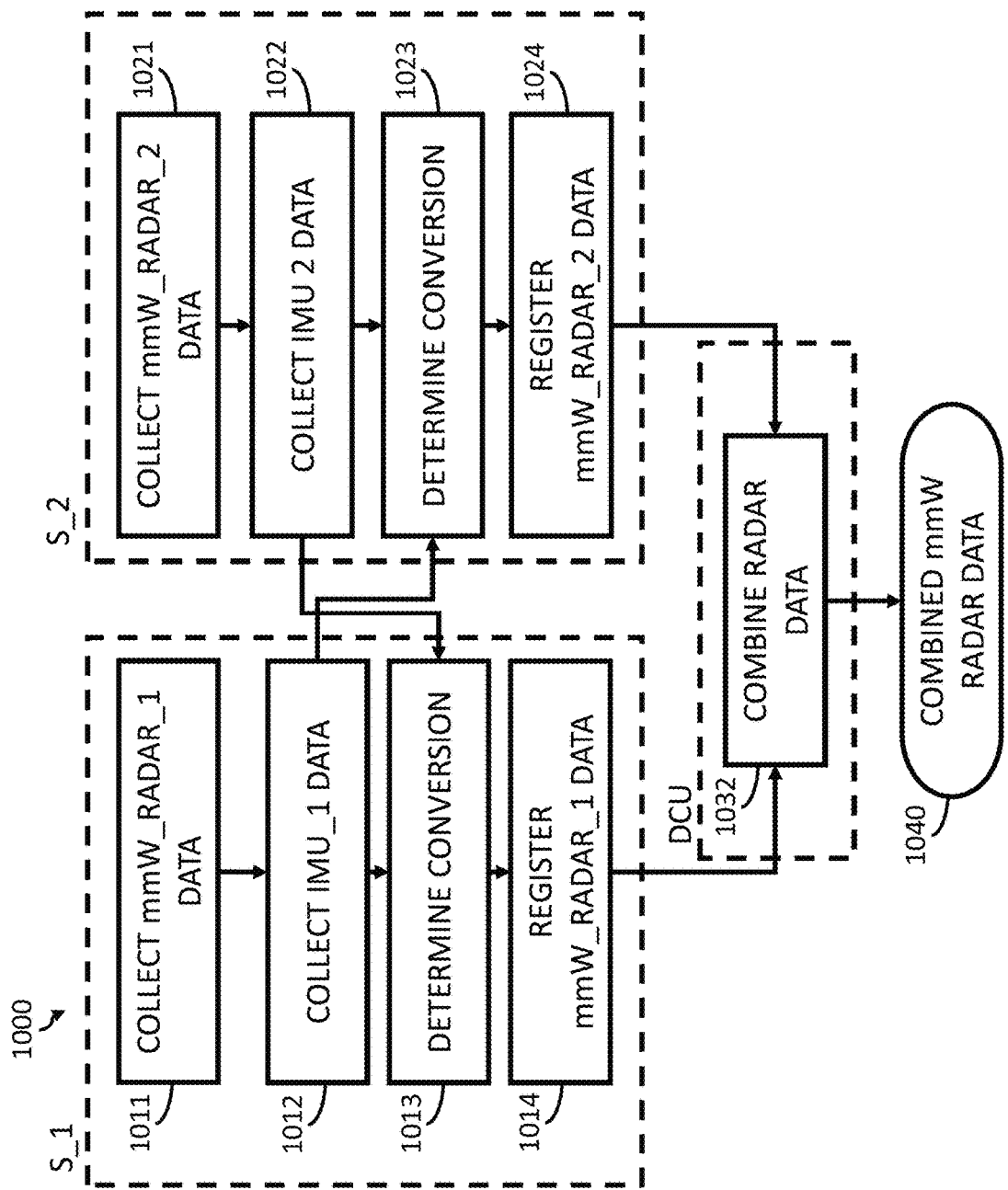
FIG. 10 is a flowchart of a method for generating combined mmW radar data according to a second possible implementation of the present disclosure.

FIG. 10 is a flowchart of a method for generating combined mmW radar data 1040 according to a second possible implementation of the present disclosure. The method 1000 includes collecting 1011, at the first radar sensor (S_1), IMU data using IMU_1 and collecting 1012 mmW radar data using mmW_radar_1. The method 1000 further includes collecting 1021, at the second radar sensor (S_2), IMU data using IMU_2 and collecting 1022 mmW radar data using mmW_radar_2. In this implementation IMU data may be communicated between the radar sensors, such as by one of the communication topologies described previously (e.g., see FIGS. 4A-4C). This communication can enable the registration to take place using the processing (i.e., the SCU) of each radar sensor.

The method 1000 further includes generating registered mmW radar data at the first radar sensor (S_1) and the second radar sensor (S1). The method 1000 further includes determining 1013 the conversion and registering 1014 the first mmW radar data (i.e., mmW_radar_1). The first SCU (i.e., SCU_1) can be configured to determine the conversion based on the first IMU data (IMU_1) and second IMU data (IMU_2) received form the second radar sensor (S_2). For example, the relative orientation of the coordinate systems for each radar sensor may be calculated to determine the orientation. The method further includes determining 1023 the conversion and registering 1024 the second mmW radar data (i.e., mmW_radar_2). For example, the second SCU (i.e., SCU_2) can be configured to determine the conversion based on the second IMU data (IMU_2) and first IMU data (IMU_1) received from the first radar sensor (S_1).

The method 1000 further includes communicating the registered mmW radar data to the DCU of the automatic door system. The communication may be accomplished according to one of the topologies described previously, such as shown in FIGS. 4A-4C. The method 1000 further includes combining 1032 the registered radar data at the DCU to generate combined mmW radar data 1040. This method 1000 for generating the combined mmW radar data may have the advantage of versatility because only registered data is communicated. Accordingly, radar sensors may be easily added or removed from the automatic door system.

The conversions described may include selecting a reference coordinate system upon which to compare the orientation of a radar sensor (i.e., IMU data). The reference coordinate system may be a fixed coordinate system, such as described by the dimensions of an automatic door. In this case, no IMU data may be necessarily collected for the door because its orientation and position are fixed and known. Alternatively, the reference coordinate system may be a coordinate system of a particular radar sensor (e.g., master sensor). In this case, the IMU data from the particular radar sensor may be collected and used as a reference to which the IMU data from other radar sensors may be compared to determine the necessary conversion for registration. Variations to these approaches may exists and are within the scope of the present disclosure.

Figure 11:
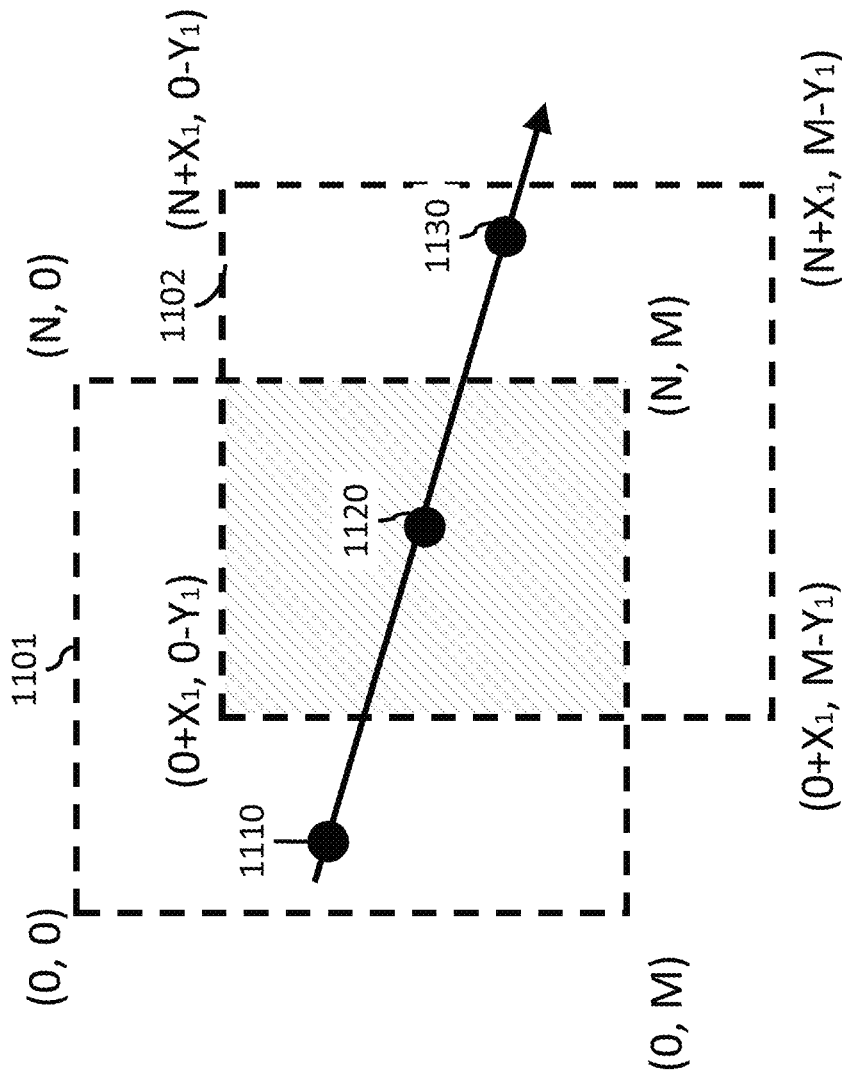
FIG. 11 illustrates a combined door area that includes two door areas according to a possible implementation of the present disclosure.

FIG. 11 illustrates a combined door area generated by two radar sensors according to a possible implementation of the present disclosure. The data from the first radar sensor and the mmW radar data from the second radar sensor are registered so that the positions in the two door areas both reference a common origin. A first door area 1101 has N×M possible positions and includes a starting position (0,0) that is the origin. A second door area 1102 also has N×M possible positions but is spatially offset by from the origin in an x-direction and a y-direction. Accordingly, the starting position for the second door area is $(+X_1, -Y_1)$. The door areas include an overlap region (i.e., shown as hashed) which is included in the fields of view (door areas) of both radar sensors. For example, a target may be found at position (N, M) in registered radar data from both the first radar a sensor and the second radar sensor.

The first door area 1101 and the second door area 1102 can be included in a combined door area including combined mmW radar data. The combined mmW radar data may be the union of radar data from the first radar sensor and radar data from the second sensor. The combined door area may include a region including radar data from the first radar sensor (and not the second radar sensor) and a region including radar data from the second sensor (and not the first radar sensor). In the overlap region, the registered radar data from each sensor should ideally match. For example, a target located at a position in the overlap region should be measured at the same position by each radar sensor after the data is registered. Accordingly, combining radar data in the overlap region may include selecting one of the radar sensor registered data or processing (e.g., averaging) the registered data from the two sensors for each point in the overlap region. Zones can be defined in the combined door area so that when a target is detected at a position in the combined door area that corresponds to a zone, a corresponding action (or inaction) may be triggered. Further key positions may be defined in the combined door area, such as a center of the door.

The combined mmW radar data can be a three-dimensional array (i.e., point cloud) of received (i.e., returned) signals from the radar sensors. Each point in the point cloud can be associated with a range to a target from the door and an angle to the target with respect to the door. A strong received signal at a point may indicate a target located at the point. A target may include a group of high received signal points that are clustered in a shape corresponding to the target. In other words, multiple points in the point cloud may correspond to a target. A range to the target may be determined from the ranges of the points in the point cloud corresponding to the target and an angle of the target may be determined from the angles of the points in the point cloud corresponding to the target. The ranges and the angles of the target can change as the target moves. The combined mmW radar data may be analyzed to track one or more targets in a combined door area corresponding to the combined mmW radar data.

A moving target can be tracked through the combined area. For example, the target at a first time is determined to be at a first position 1110 that is included in the first door area 1101, the target at the second time is at a second position 1120 that is included in both the first door area and the second door area, and the target at a third time is at a third position 1130 that is included in the second door area. Tracking may include determining which door area (i.e., radar sensor) includes the target and handing off the tracking between door areas (i.e., radar sensors) as the target moves.

Figure 12:
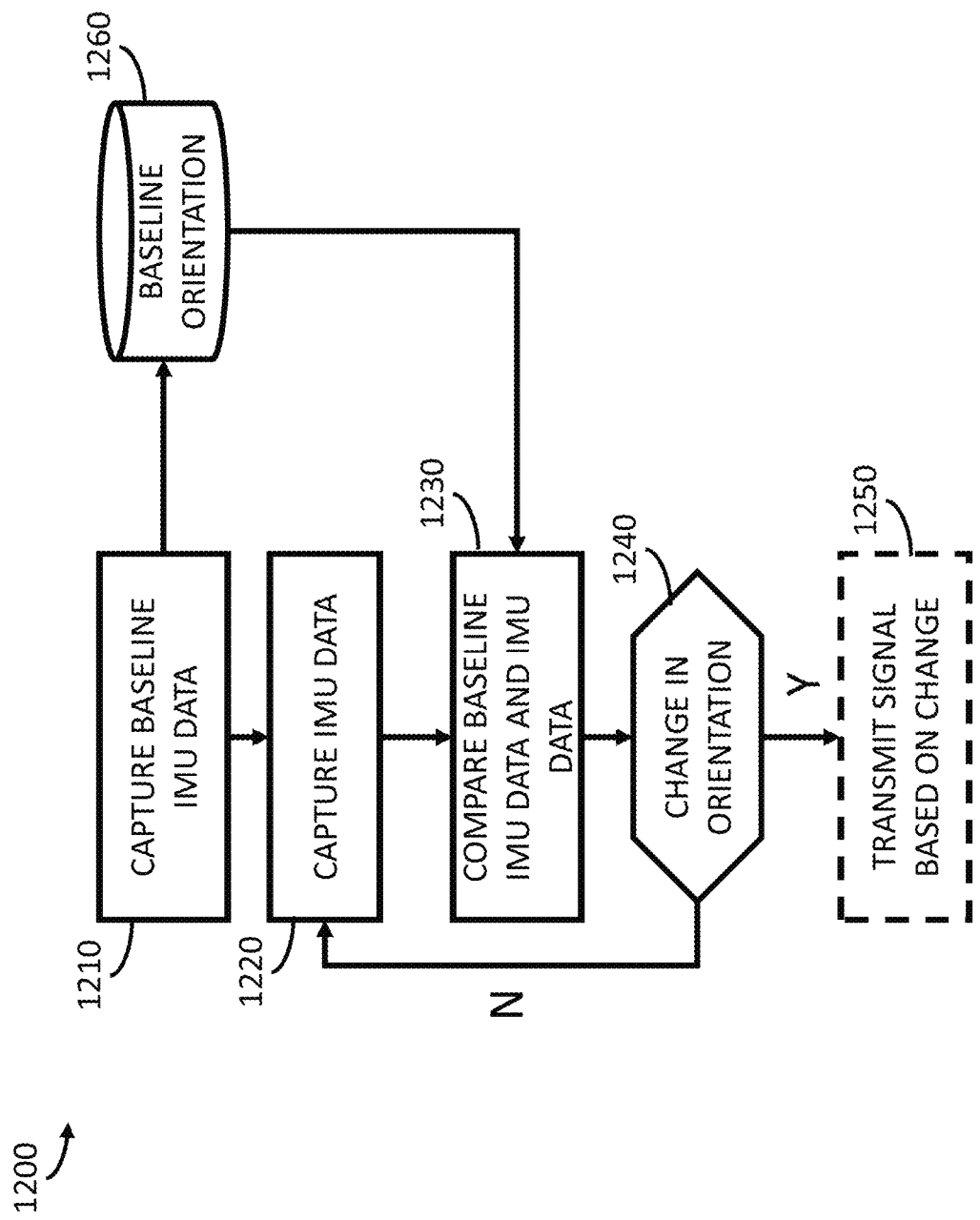
FIG. 12 is a flowchart of a method for detecting a change in orientation of a mmW radar according to a possible implementation of the present disclosure.

The IMU data for each radar sensor 400 may be expected to remain the same after a service process, such as installation, commissioning, calibration, or re-calibration, is performed. Accordingly, each radar sensor 400 may be configured to monitor its position over time after the service process. which may be useful in generating a notification for a new service process, such as re-calibration. FIG. 12 is a flowchart of a method 1200 for detecting a change in position of a radar sensor. The SCU 520 and the memory 530 of each radar sensor in a door sensor system may be configured by software to perform one or more of the steps of the method 1200.

In the method 1200, baseline IMU data is captured 1210. The capture of the baseline IMU may be triggered manually. For example, a service technician may trigger an SCU 520 to capture and store baseline IMU data in a memory 530 as a baseline orientation 1260. The capture of the baseline IMU data may also be triggered automatically. For example, the SCU 520 may be configured to capture and store a baseline orientation 1260 (e.g., in a memory 530 of the SCU) periodically (e.g., quarterly, yearly) to account for drifting measurement results due to external factors, such as age and temperature. After storing the baseline orientation (i.e., baseline IMU data), the method 1200 may include capturing 1220 IMU data. For example, the SCU 520 may be configured to receive the IMU data captured by the IMU regularly as part of the target sensing for the automatic door operation. The method 1200 may further include comparing 1230 the baseline IMU data (i.e., baseline orientation) and the IMU data to determine if a change 1240 in orientation of the mmW radar has occurred. For example, the SCU 520 may be configured to receive IMU data from the IMU and recall baseline IMU data (i.e., baseline orientation) from a memory 530 of the SCU and perform a comparison. If the comparison satisfies a criterion (e.g., exceeds a threshold) then the SCU may be configured to transmit 1250 a signal based on the change. The method may repeat the comparison (e.g., regularly, as needed, etc.) in order to monitor the position/orientation of the mmW radar.

The signal may be used to trigger events such as a service alert, a recalibration (e.g., automatic recalibration), or the like. In a possible implementation, a change in the position and/or orientation of the mmW radar 600 can trigger the sensor control unit (i.e., SCU 520) to transmit a signal to the DCU 210 to indicate that the IMU data for a radar sensor in the door sensor system 220 has changed. This signal may trigger the DCU 210 to recalibrate the door sensor system and/or to transmit an alert via the door interface 260. For example, a possible alert can be a notification that service of the automatic door system 200 is required. In another example, the signal may trigger the DCU to determine and update values used for the conversion to register and combine mmW radar data.

The combined mmW radar data can include more information than required simply to detect motion and presence. Control of the door can be controlled according to more conditions (i.e., enhanced) based on the additional information. The enhanced door control can be tailored to match a target and its movement and can be less prone to errors (e.g., false opening/closing). Further, this control can account for multiple targets and can adapt to changing conditions. This may have the technical effect of increasing the safety and reliability of an automatic door.

Returning to FIG. 2, the combined mmW radar data may be processed by the DCU 210 to generate signals that control the opening and closing of the door. For example, based on an analysis of the combined mmW radar data, the DCU 210 can be configured to control the operation of the door. The operation of the door may include an opening or a closing. Further, the operation of the door may include an amount, a position, or a timing of the opening/closing. The DCU 210 may control the operation by transmitting signals (e.g., pulse width modulated (PWM) signals, torque signals) to the door operator 230 which can translate these signals and operate a motor of the door assembly accordingly.

Figure 13:
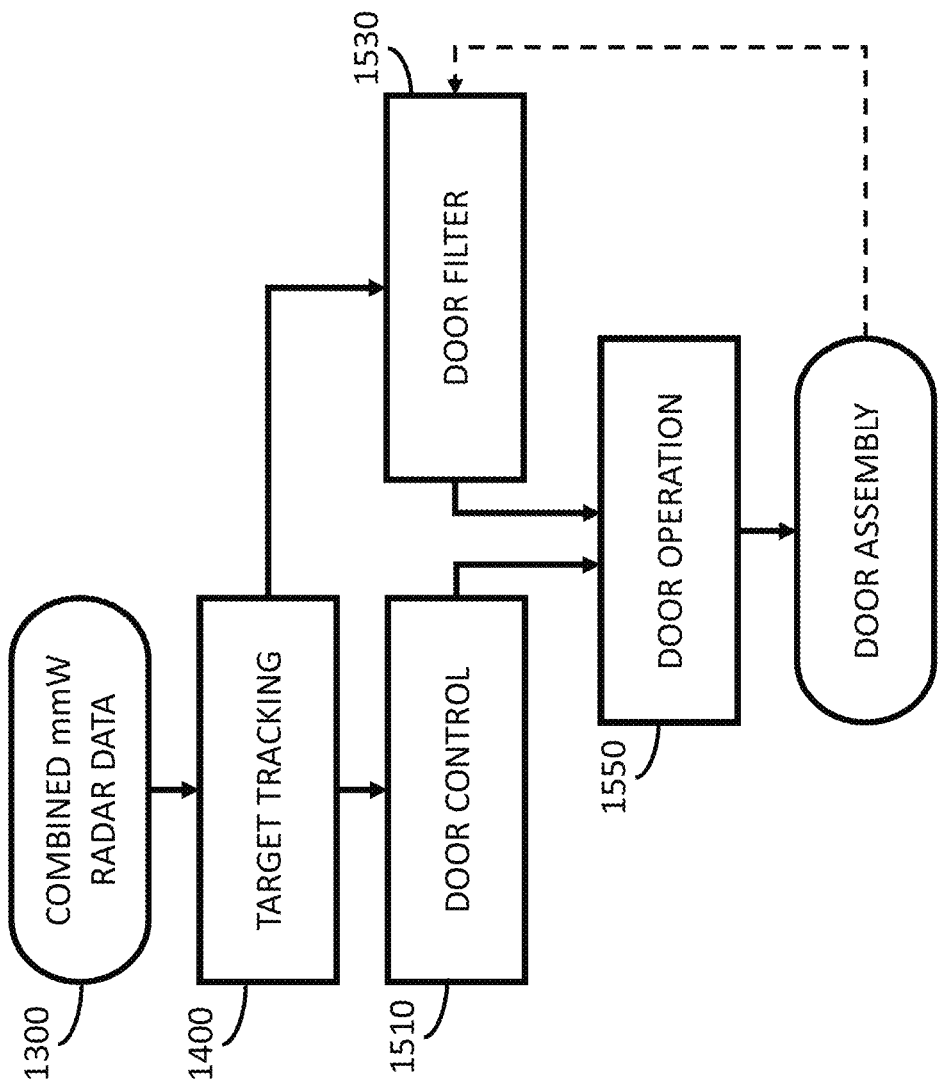
FIG. 13 is a flow chart illustrating modules of the DCU configured for door operation according to possible implementation of the present disclosure.

FIG. 13. is a flow chart illustrating functions (i.e., modules) that may configure the DCU for door operation. In other words, the modules may correspond to programs, subroutines, etc. running on a processor (or processors) of the DCU to configure the DCU to perform the function of the module. The DCU may include a target tracking module 1400. The target tracking module 1400 can be configured to receive the combined mmW radar data 1300 and to identify the one or more targets from the combined mmW radar data 1300. The target tracking module 1400 may be further configured to determine a position of each of the one or more identified targets, and the target tracking module 1400 may be further configured to determine movement of the one or more identified targets, which are in motion.

The results of the target tracking module can be transmitted to a door control module 1510. The door control module 1510 can be configured to process the information about the one or more targets to determine how, and when, the door should be controlled. Additionally, the results of the target tracking module 1400 can be transmitted to a door filter module 1530. The door filter module 1530 can be configured to process the information about the one or more targets and to identify certain conditions that could trigger certain door operation (or prevent certain door operations). For example, the door operations triggered by the door filter module 1530 may be associated with an operating requirement for safety and/or may be associated with an operating requirement for improving the reliability of the door. For example, the door filter module may be configured to prevent the automatic door from closing on a person in the doorway or from opening in response to movements that should not open the door.

Information from the door control module 1510 and the door filter module 1530 can be received by a door operation module 1550. The door operation module 1550 can be configured to determine when and how to open/close the automatic door based on the information from the door control module 1510 and the door filter module 1530. Some determinations made by the door operation module can include an amount of a door opening/closing, a position of the door opening/closing, a speed of the door opening/closing, and/or a time of the door opening/closing. The door operation module 1550 may be further configured to translate the details regarding the door opening/closing into signals that can be transmitted from the DCU to the door assembly (e.g., the door operator) for door control. Information from the door assembly may be fed back to the door control and/or door filter to help operate the door. For example, the determination of how and when to open/close the automatic door may be based on the state (e.g., opening, opened, closing, closed, etc.) of the door assembly.

Figure 14:
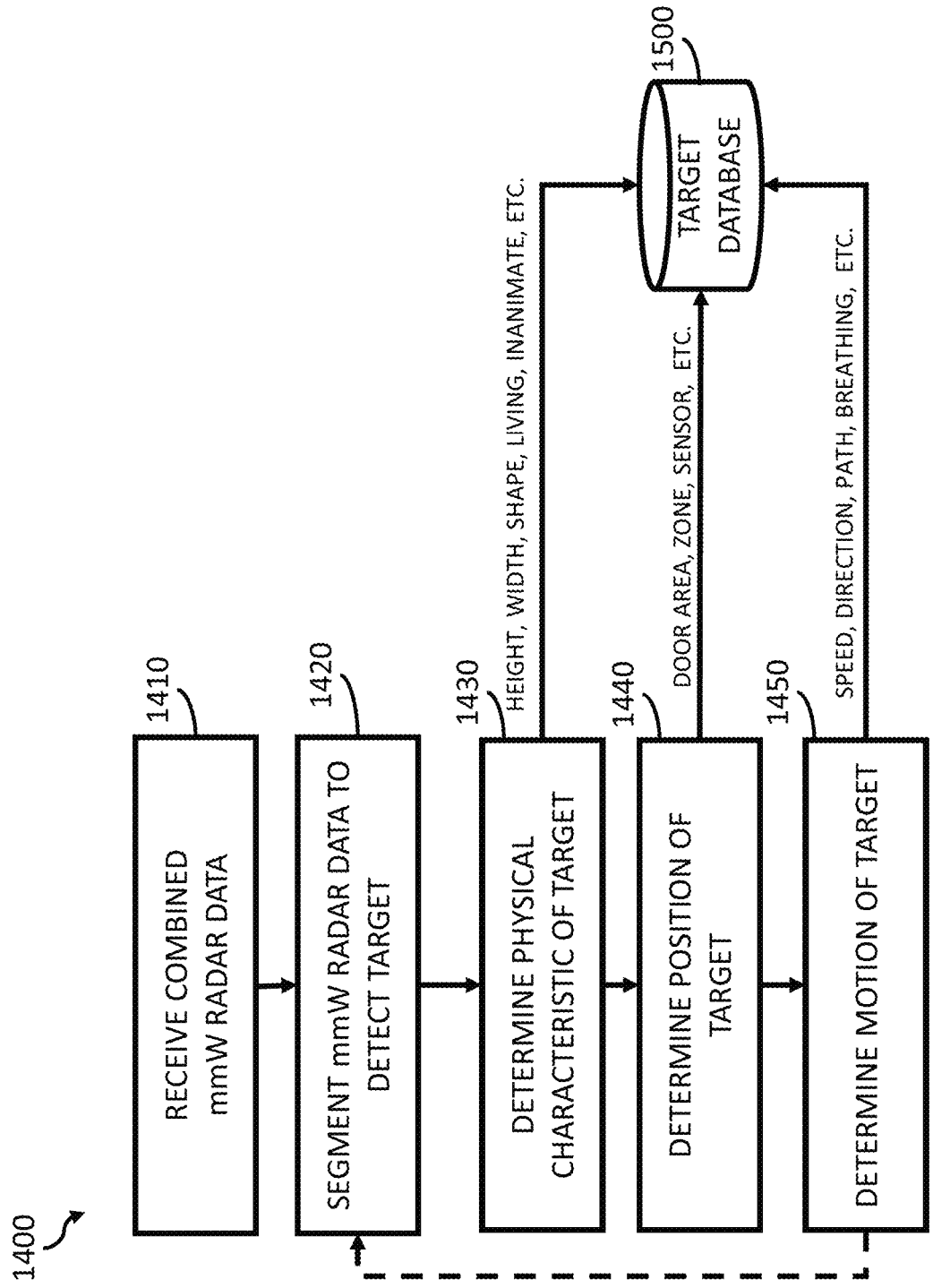
FIG. 14 is a flowchart illustrating a method for target tracking according to a possible implementation of the present disclosure.

FIG. 14 is a flowchart illustrating details of the target tracking module 1400. In other words, FIG. 14 is a flowchart illustrating a method for target tracking according to a possible implementation of the present disclosure. After receiving 1410 the combined mmW radar data, the target tracking module 1400 may be configured to segment 1420 the combined mmW radar data to detect a target. The segmenting can include partitioning points of the mmW radar data into groups corresponding to the target. For example, the combined mmW radar data may include a three-dimensional (3D) array of points (i.e., point cloud) with each point corresponding to a reflected signal from targets/objects in the combined door area. Segmentation can label certain points in the point cloud as corresponding to the target. Further, segmentation may include determining a boundary or boundaries in the combined mmW radar data that define the target. In other words, the target tracking module 1400 can be configured to detect a target in the combined door area. The detected targets may include people, animals, structures, and any other object/entity that can reflect signals back to the radar sensor. The mmW radar data corresponding to the detected targets may be further analyzed by the target tracking module to distinguish the targets further so that, for example, a person may be distinguished from an object (i.e., classified).

After a target is detected, the target tracking module may be further configured to determine 1430 physical characteristics of the target. For example, the target data may be analyzed to determine a shape of the target. The shape of the target may include a width of the target. Additionally, the floor may be detected from the combined mmW radar data and the height of the target off the floor may be determined. Physical characteristics of the target may help to classify the target. For example, the target may be classified as living (e.g., a person) or as an inanimate (e.g., an object) based on its physical characteristics (e.g., height). These physical characteristics are provided as examples. It is recognized that other physical characteristics and/or information related to physical characteristics (e.g., inanimate/animate) may be determined for a target. Accordingly, this discussion is not intended to limit the present disclosure to these examples.

After a target is detected, the target tracking module may be further configured to determine 1440 a position of the target. The position of the target may be mapped to a position, or region, in the combined door area. Further the position of the target may include a mapping to a particular door area in the combined door area. For example, the position of the target may be designated as corresponding to a particular radar sensor. Further, the position of the target may include a mapping to a zone (e.g., activation zone 131, presence zone 132, etc.) within the combined door area. These positions are provided as examples. It is recognized that other positions and/or information related to a position (e.g., zone) may be determined for a target. Accordingly, this discussion is not intended to limit the present disclosure to these examples.

After a target is detected, the target tracking module may be further configured to determine 1450 a motion of the target. The motion of the target may include a velocity of the target, which includes a speed of the motion and a direction of the motion. When the motion of the target is combined with a position of the target, a path of the target may be determined. In some implementations, the mmW radar data may be analyzed to determine motion on a very small scale. For example, a breathing motion of a person may be detected and used to classify the target (e.g., as animate). These motions are provided as examples. It is recognized that other motions and/or information related to motion (e.g., breathing) may be determined for a target. Accordingly, this discussion is not intended to limit the present disclosure to these examples.

The target tracking module 1400 may be further configured to record (i.e., store) the physical characteristic information, the position information, and/or the motion information (i.e., target information) in a target database 1500. In a possible implementation, the target database 1500 may be queried based on the physical characteristic information, the position information, and/or the motion information to determine if the target is new or if the target is already recorded in the target database. For a target recognized as being in the database, the target tracking module 1400 may be configured to update target information stored for the target. The updates may also add or create new target information corresponding to the target. For example, previously obtained positions may be combined with presently obtained positions to compute a path of the target.

After the target database is updated for a detected target, the mmW radar data may be further analyzed for other targets and the process may be repeated. In other words, detecting targets and determining the corresponding target information may be carried out in series until all targets are recorded. In another possible implementation, segmenting the mmW radar data may include detecting multiple targets in one step and determining the target information for each of the multiple targets may be carried out in a parallel fashion.

Figure 15:
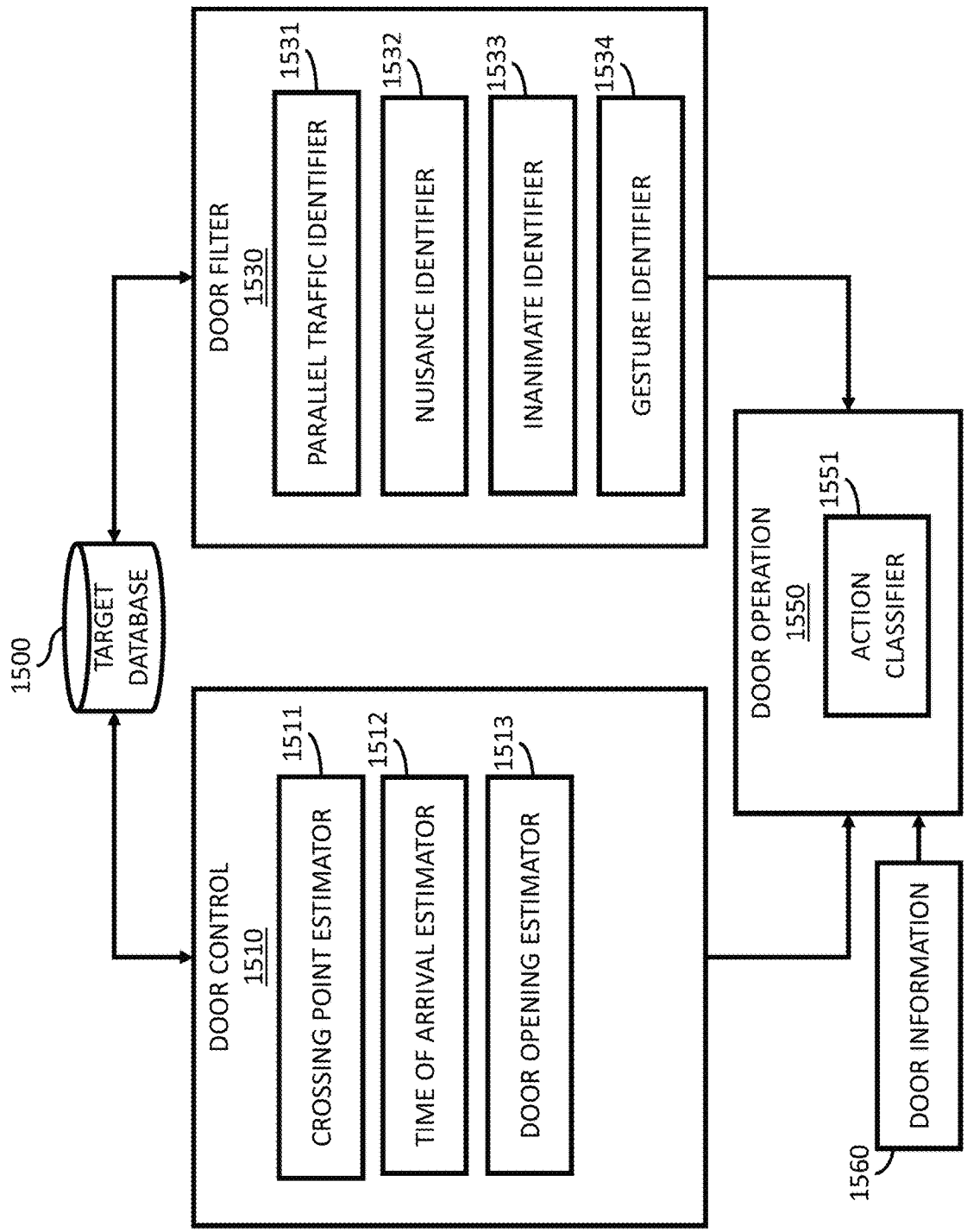
FIG. 15 is a flowchart illustrating details of the door control module, the door filter module, and the door operation module according to a possible implementation of the present disclosure.

FIG. 15 is a flowchart illustrating details of the door control module 1510, the door filter module 1530, and the door operation module 1550 according to a possible implementation of the present disclosure. The details will be described for a target, though in practice multiple targets may be processed simultaneously. The door control module 1510 (i.e., door control) and the door filter module 1530 (i.e., door filter) are configured to process the physical characteristic information, the position information, and/or the motion information of the target (e.g., from the target database 1500) in order to generate estimates (e.g., predictions) and identifications that can be used by a door operation module 1550 (i.e., door operation) to decide an action to be taken with the door. Additionally, a conclusion made by the door operation module may be based on door information 1560, such as a state of the door, a specification of the door, and/or a door model, which is a mathematical representation of the door based on its specifications.

As mentioned previously, the door control module 1510 can be configured to process target information to determine how, and when, the door should be controlled. For this, the door control module 1510 may include a crossing point estimator 1511. The crossing point estimator 1511 can be configured to estimate if the target will cross the threshold 115 of the door opening 103. When it is determined that the target will cross the threshold 115 of the door opening 103, the crossing point estimator 1511 can be further configured to estimate where, within the door opening 103, the target will cross the threshold 115 of the automatic door. These estimates may be based on the current position of the target and the target's direction of movement obtained from the target database 1500 (e.g., by query).

The door control module 1510 may further include a time of arrival estimator 1512. The time of arrival estimator 1512 can be configured to estimate when (i.e., a time) the target will arrive at the threshold of the automatic door. This estimate may be based on the position and velocity (i.e., speed, direction) of the target.

The door control module 1510 may further include a door opening estimator 1513. The door opening estimator 1513 can be configured to estimate how large a door opening is needed to accommodate the target. The estimated door opening can be less than a full (i.e., 100%) door opening. This estimate may be based on the size (e.g., width, height), and shape of the target. In some implementations, the door opening estimator 1513 can be configured to estimate where in a range of possible door openings the door opening should be located. This estimate may be based on the crossing point estimated for the target. The results of the estimators may be transmitted to the door operation module 1550. Additionally, the results of the estimators may be transmitted to the target database 1500 to further characterize the target.

As mentioned previously, the door filter module 1530 can be configured to process target information to identify certain conditions that could trigger certain door operations (or prevent certain door operations). These identifications can be used to filter the target. In other words, based on the identified conditions, the target may be considered or ignored for door control. The door filter module 1530 may include a parallel traffic identifier 1531 (i.e., parallel traffic filter). The parallel traffic identifier may determine motion of a target that is moving in a direction other than towards the door. For example, the parallel traffic identifier 1531 may be configured to determine that the target is moving in a direction that is substantially parallel with the door opening 103. The output of the parallel traffic identifier can be a signal having a signal level that indicates that parallel traffic has been identified (e.g., HIGH level) or that parallel traffic has not been identified (e.g., LOW level). The signal may trigger the door operation module 1550 to ignore a target that is not expected to interact with the door.

The door filter module 1530 may further include a nuisance identifier 1532 (i.e., nuisance filter). The nuisance identifier may be configured to determine motion of a target that can be ruled out as actionable movement for the automatic door. For example, the nuisance identifier may determine that the target is moving in a repetitive way, such as motion from a tree blowing in the wind. The output of the nuisance identifier 1532 can be a signal having a signal level that indicates that a nuisance has been identified (e.g., HIGH level) or that a nuisance has not been identified (e.g., LOW level). The signal may trigger the door operation module 1550 to ignore a nuisance target.

The door filter module 1530 may further include an inanimate identifier 1533. The inanimate identifier 1533 may determine that a target is inanimate (i.e., not living). For example, the inanimate identifier may determine that no breathing motion is associated with the target and/or that the height of the target is smaller than a threshold. The output of the inanimate identifier 1533 can be a signal having a signal level that indicates that the target present is inanimate (e.g., HIGH level) or that the target present is animate (e.g., LOW level). The signal may trigger the door operation module 1550 to ignore inanimate targets.

The door filter module 1530 may further include a gesture identifier 1534. The gesture identifier 1534 may identify motion as a particular gesture. For example, the gesture identifier may determine that a person is waving. The output of the gesture identifier 1534 can be a signal having a signal level that indicates that a motion of a target is a gesture (e.g., HIGH level) or that the motion of the target present is not a gesture (e.g., LOW level). Alternatively, the signal may indicate which gesture from a plurality of possible gestures is detected. The signal may trigger the door operation module 1550 to control the door (e.g., open the door) according to the gesture. The results of the identifiers (i.e., filters) may be transmitted to the door operation module 1550. Additionally, the results of the estimators may be transmitted to the target database 1500 to further characterize the target.

As mentioned previously, the door operation module 1550 can be configured to process one or more estimates generated by the door control module 1510, one or more identifications generated by the door filter module 1530, and door information 1560 to determine an action for the automatic door. The door information 1560 may include a state (e.g., percent opened) of the automatic door. The state of the door may be determined by a mathematical door model with inputs corresponding to the inputs of the door. The door operation module 1550 may include an action classifier 1551 that is configured to generate a door action based on the estimates, identifications, and the door information. In a possible implementation the action classifier 1551 is a machine learning model (e.g., neural network) configured to output a signal corresponding to an action of the door based on the estimates and identifications. The door operation module 1550 may further translate this signal corresponding to the action of the door into a signal, or signals, to control the door assembly.

Figure 16:
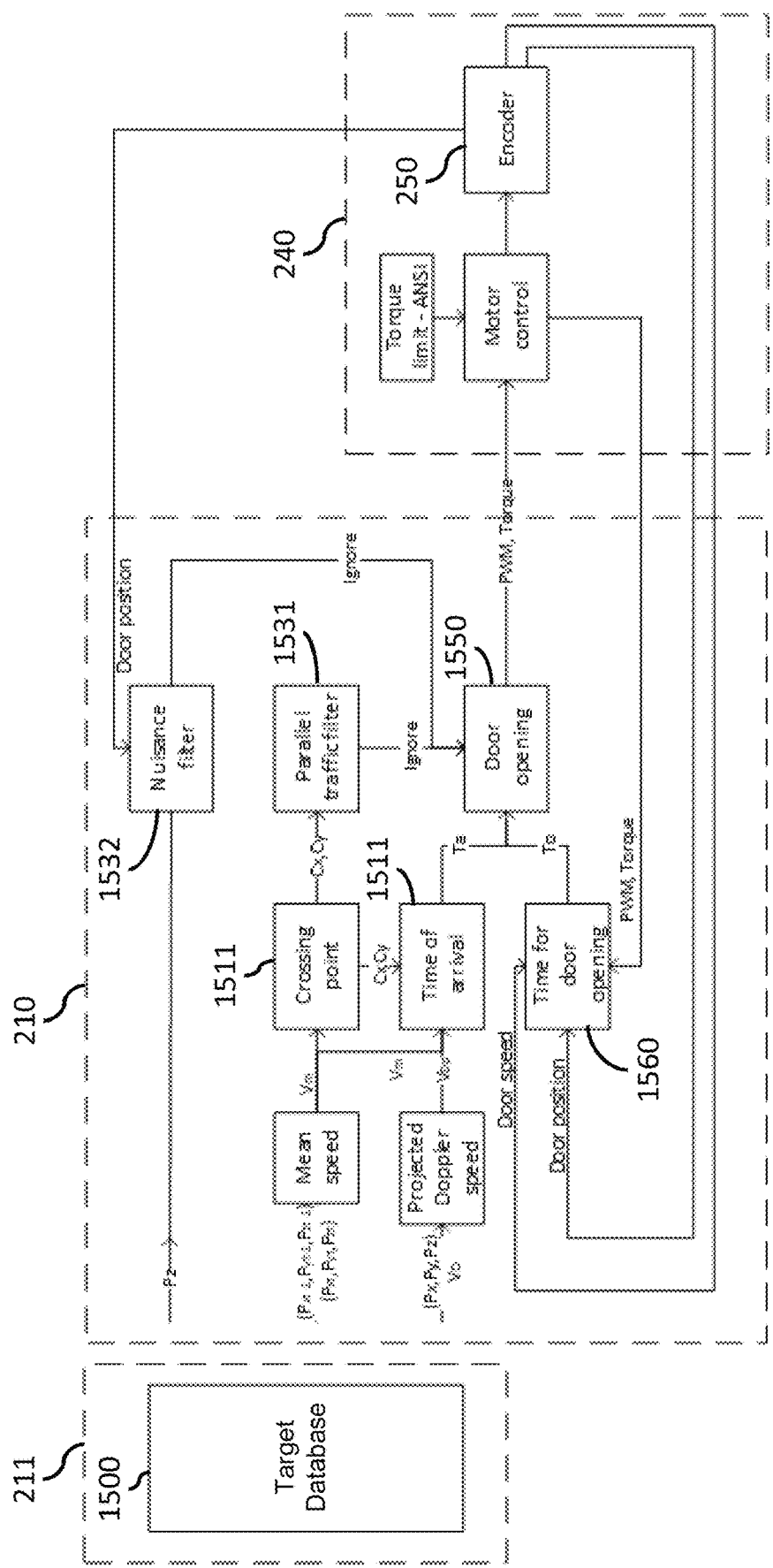
FIG. 16 is a block diagram illustrating an automatic door system according to a possible implementation of the present disclosure.

FIG. 16 is a block diagram illustrating a possible implementation of the automatic door system. As shown, the DCU 210 can communicate with a memory (e.g., memory 211 included in the DCU) in which the target database 1500 is stored. The DCU 210 can be configured (e.g., by software) to access the target database 1500 to gather combined mmW radar data (i.e., radar data) about a target. The radar data can include three positions (i.e., $P_{xt}$, $P_{yt}$, $P_{zt}$) corresponding to three dimensions (3D) of a reference coordinate system. For the implementation described, the positions are registered so that $P_{zt}=0$ corresponds to a height of zero (i.e., at a floor level). The radar data may be processed to derive information about the movement of the target. For example, various velocities (i.e., speeds) of the target may be derived.

Figure 17:
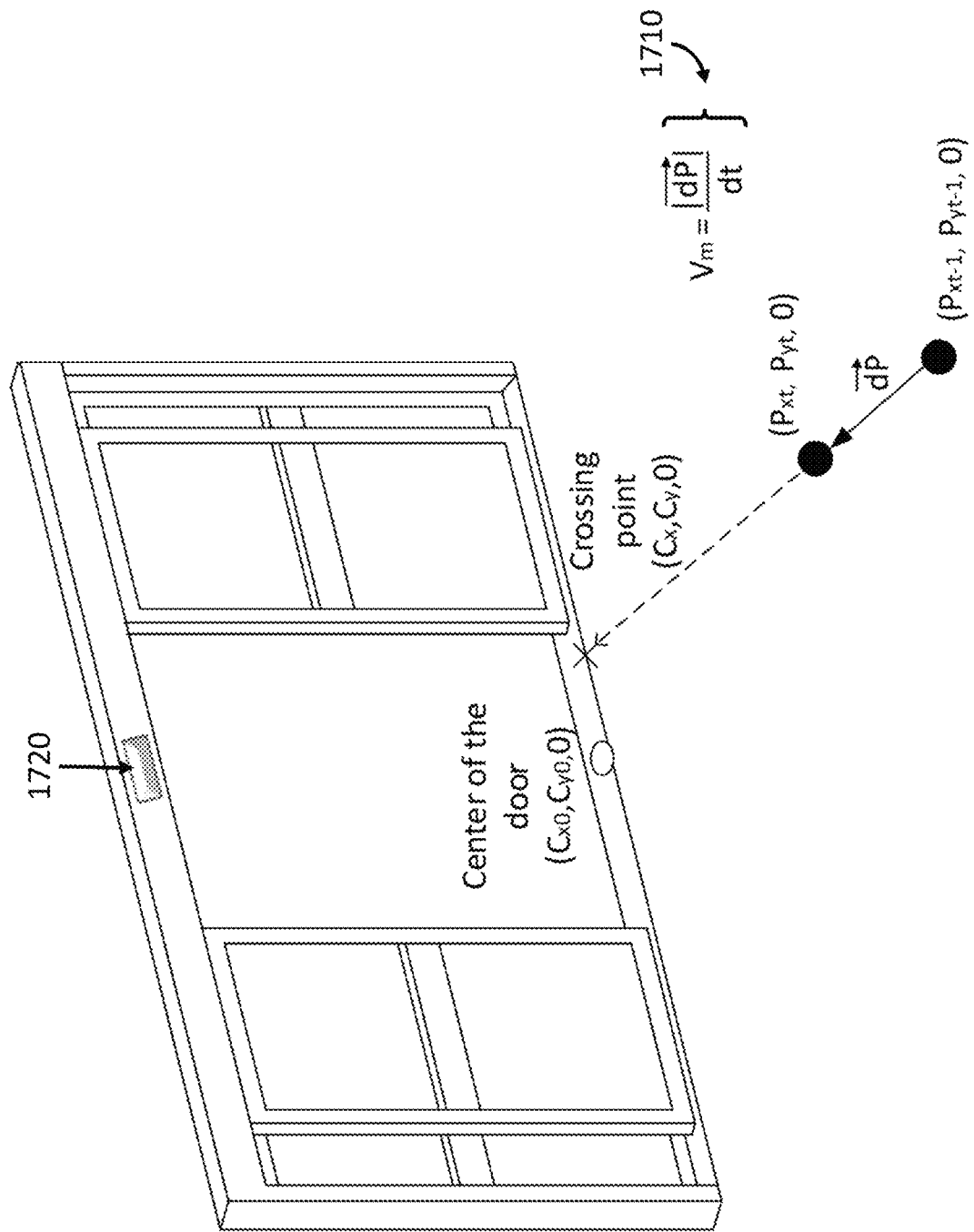
FIG. 17 is a diagram illustrating a mean speed calculation according to an implementation of the present disclosure.

FIG. 17 is a diagram illustrating a mean speed ($V_m$) calculation according to a possible implementation of the present disclosure. The mean speed is computed as a change in position over a change in time (i.e., a rate of change in position). The mean speed is based on a position change vector ($\vec{dP}$). The position change vector ($\vec{dP}$) is in a direction along a line between a first position ($P_{xt-1}$, $P_{yt-1}$, 0) at a first time and a second position ($P_{xt}$, $P_{yt}$, 0) at a second time. The positions can be included in the registered radar data from a radar sensor 1720. As shown by equation 1710, the mean speed can then be computed as the magnitude of the position change vector ($|\vec{dP}|$) divided by the change in time between the first time and the second time (dt). In other words, the mean speed is the rate at which the target is moving towards a crossing point (i.e., shown in FIG. 17 as X) of the threshold of the automatic door.

A crossing point estimator 1511 may use the position change vector ($\vec{dP}$) to determine where the target will cross the threshold of the automatic door. As shown in FIG. 17, the position change vector ($\vec{dP}$) can be projected to a plane of the door in which the center of the door is at ($C_{x0}$, $C_{y0}$, 0) (i.e., shown in FIG. 17 as O) in order to estimate the crossing point ($C_x$, $C_y$, 0), which is also in the plane of the door. The center of the door may not be aligned with the crossing point.

A radar sensor 1720 may be position directly above the center of the door (i.e., may be aligned with the center of the door). The radar sensor can be configured to directly measure velocity (i.e., speed) of a target; however, this speed, which is known as the measured doppler speed ($V_D$), is in a direction towards the radar sensor. Accordingly, a mean speed ($V_m$) based on a calculation using positions measured by the radar sensor may be different from a measured doppler speed ($V_D$) based on a direct measurement of speed by the radar sensor.

Figure 18:
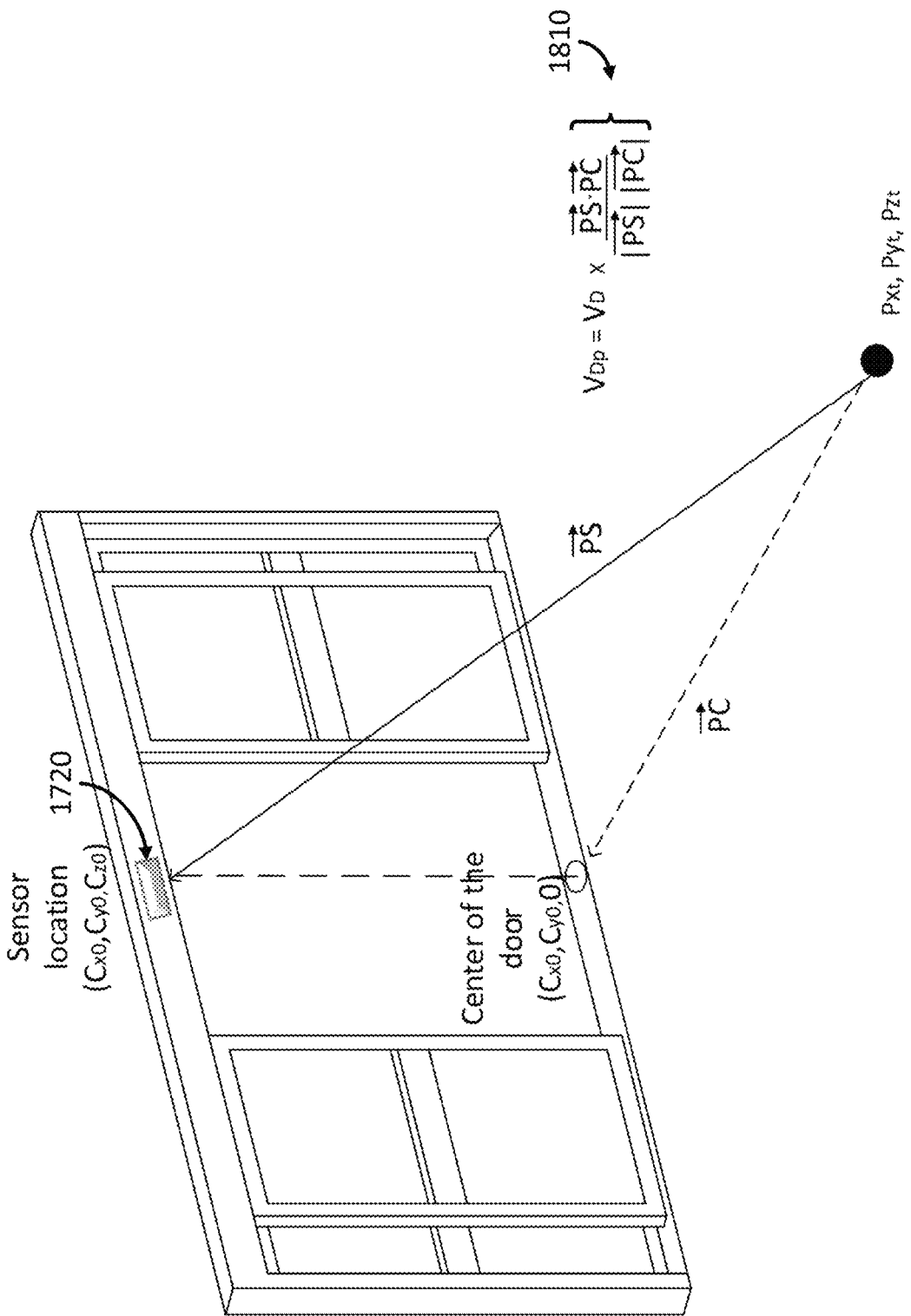
FIG. 18 is a diagram illustrating a projected doppler speed calculation according to an implementation of the present disclosure.

FIG. 18 is a diagram illustrating a projected doppler speed ($V_{Dp}$) calculation according to an implementation of the present disclosure. As shown, a registered location ($C_{x0}$, $C_{y0}$, $C_{z0}$) of the radar sensor is above the door opening (i.e., above the center of the door). The radar sensor may be configured to measure a doppler speed ($V_D$) at which the target approaches (i.e., closes in on) the radar sensor 1720. In other words, the speed measured by the radar sensor may be a speed along a first vector component ($\vec{PS}$) towards the radar sensor 1720. The speed for computing a time of arrival is along a second vector component ($\vec{PC}$) towards the center of the door. As shown by equation 1810, the projected doppler speed ($V_{Dp}$) is a fraction of the measured doppler speed ($V_D$) in the direction towards the center of the door. In other words, the projected doppler speed is the speed component from the target location directed to the center of the door (at zero height).

Control of the automatic door may also be based on an estimated time of arrival ($T_a$) of the target to the door from its current position ($P_T$) and a time of arrival estimator 1512 can be configured to calculate a time of arrival using the mean speed ($V_M$) and/or the measured doppler speed ($V_D$). In other words, a time to arrive at the door can be computed as the time required to reach the crossing point ($C_x$, $C_y$, 0) or the time required to reach the center of the door ($C_{x0}$, $C_{y0}$, 0).

The time of arrival estimator may compute (i) a mean time of arrival ($T_m$) based on the mean speed ($V_M$) and (ii) a doppler time of arrival ($T_{Dp}$) based on the projected doppler speed. These arrival times may be different because the mean speed can be towards a crossing point, while the projected doppler speed can be towards a center of the door. Accordingly, the time of arrival estimator 1512 may be configured to derive a time of arrival ($T_a$) for a door opening based on these estimated times of arrival.

Figure 19:
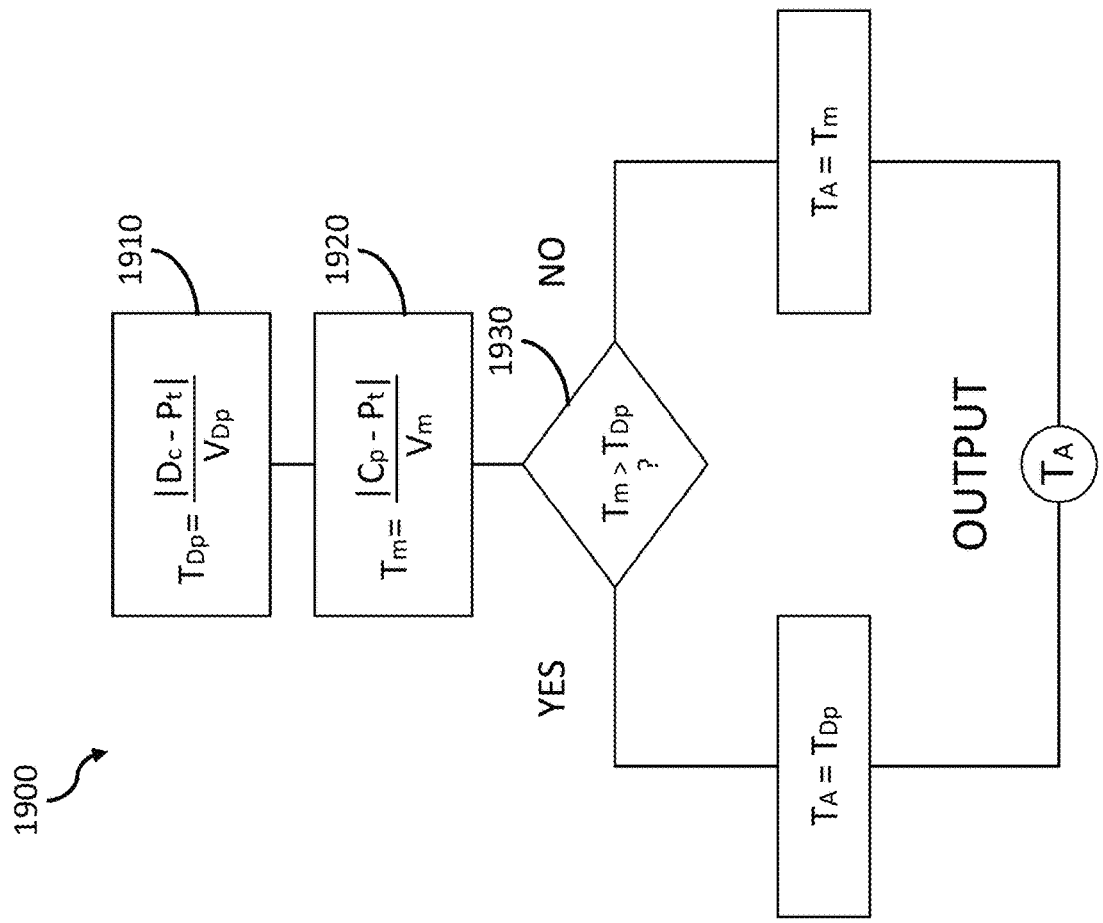
FIG. 19 is a flowchart of a method for estimating a time of arrival according to a possible implementation of the present disclosure.

FIG. 19 is a flowchart of a method for estimating a time of arrival according to a possible implementation of the present disclosure. The method 1900 may be implemented by a time of arrival estimator 1512 as described previously. As shown, the method 1900 includes computing 1910 a doppler time of arrival ($T_{Dp}$) as the distance between the door center ($D_c$) and the target position ($P_t$) divided by the projected doppler speed ($V_{Dp}$). The method 1900 may further include computing 1920 a mean time of arrival ($T_m$) as the distance between the crossing point ($C_p$) and the target position ($P_t$) divided by the mean velocity ($V_m$). The method further includers comparing 1930 the mean time of arrival ($T_m$) and the doppler time of arrival ($T_{Dp}$) to determine which is earlier (i.e., faster, shorter). The method 1900 may then include selecting the earlier of the two times as the time of arrival ($T_A$) to ensure that the door is open when the target arrives. In other words, estimating the shortest possible arrival time may prevent the door from opening later than an actual arrival time of the target.

Returning to FIG. 16, the arrival time may be received by a door operation module 1550 (i.e., door opening module). The door operation module 1550 may further include receiving a time to open ($T_o$) as part of the door information 1560. The time to open ($T_o$) may be based on door speed and door position measurements taken by a door encoder 250. Additionally, the time to open ($T_o$) may be based on a model of the door (i.e., door model). A PWM signal and a torque signal may be applied to the door model in order to determine its response. The response of the door can depend on the current PWM and torque applied to the motor, the position, speed and direction of movement of the door panels (e.g., obtained from the encoder feedback), the weight of the door panels, and the desired opening of the door.

As shown in FIG. 16, a target may be prevented from opening of the door (i.e., ignored) if the target is classified as a nuisance or if the movement of the target is classified as parallel traffic. In other words, a nuisance identifier 1532 (i.e., nuisance filter) may be configured to output a signal (i.e., ignore signal) that causes the door operation module 1550 to ignore the target. Additionally, a parallel traffic identifier 1531 (i.e., parallel traffic) filter may be configured to output the signal (i.e., ignore signal) that causes the door operation module 1550 to ignore the target.

Figure 20:
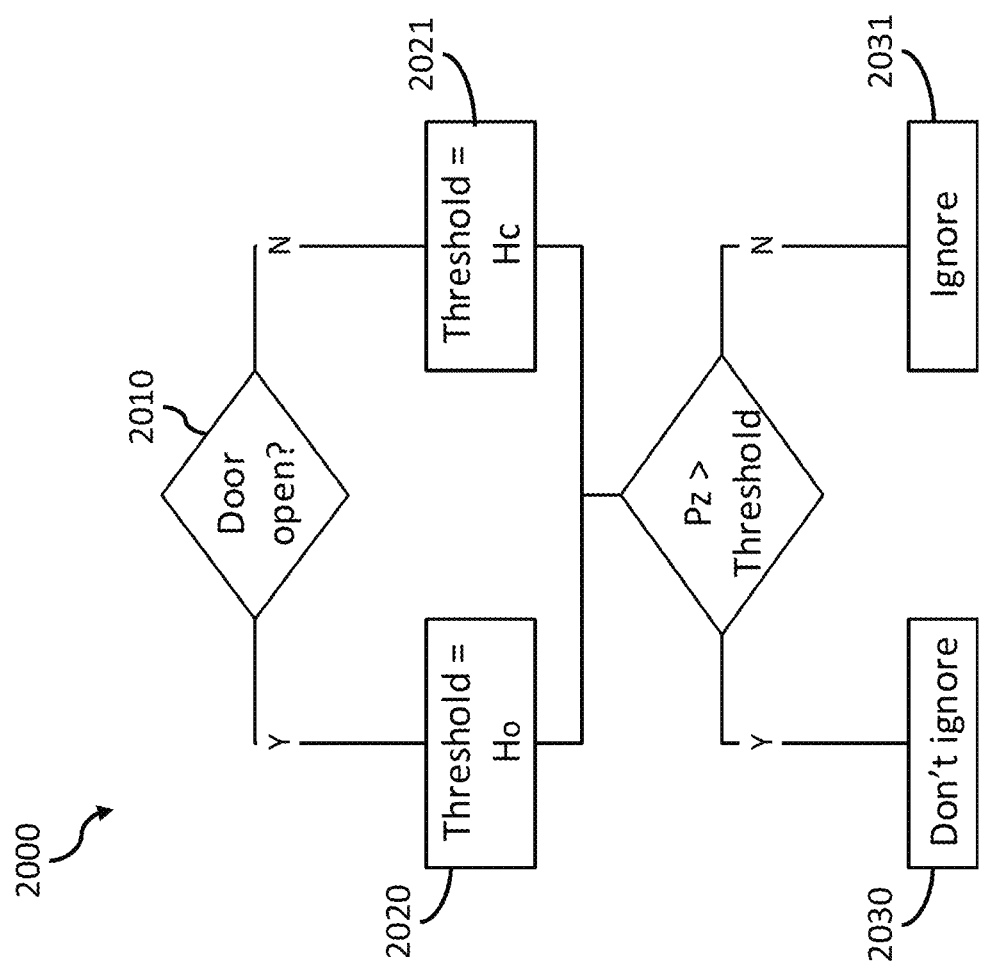
FIG. 20 is a flowchart of a method for identifying a nuisance according to a possible implementation of the present disclosure.

FIG. 20 is a flowchart of a method for identifying a nuisance according to a possible implementation of the present disclosure. The method 2000 may be implemented by a nuisance identifier 1532 (i.e., nuisance filter) as described previously. A target may be classified as a nuisance based on its height. In other words, a height dimension of the target position (i.e., $P_z$) may be compared to a threshold height (i.e., threshold) in order to determine if the target is a nuisance. The threshold height may be adjustable based on an open/closed status of the automatic door. Accordingly, the method 2000 can include determining 2010 if the door is open or closed. If the door is open, then the threshold may be set to an open threshold ($H_o$) 2020 and if the door is closed then the threshold may be set to a closed threshold ($H_c$) 2021. The open/closed status of the door may be determined based on door information. The method 2000 can further include comparing the height of the target ($P_z$) to the set threshold. If the height of the target is above the set threshold, then the target is not ignored (i.e., no ignore signal) 2030 and if the height of the target is below (i.e., shorter than) the set threshold, then the target is ignored (i.e., ignore signal) 2031. It may be useful to ignore smaller objects if the door is closed but not if the door is open, especially when it is in the process of closing. Accordingly, the open threshold ($H_o$) may be lower than the closed threshold ($H_c$) so that fewer targets are ignored.

Figure 21:
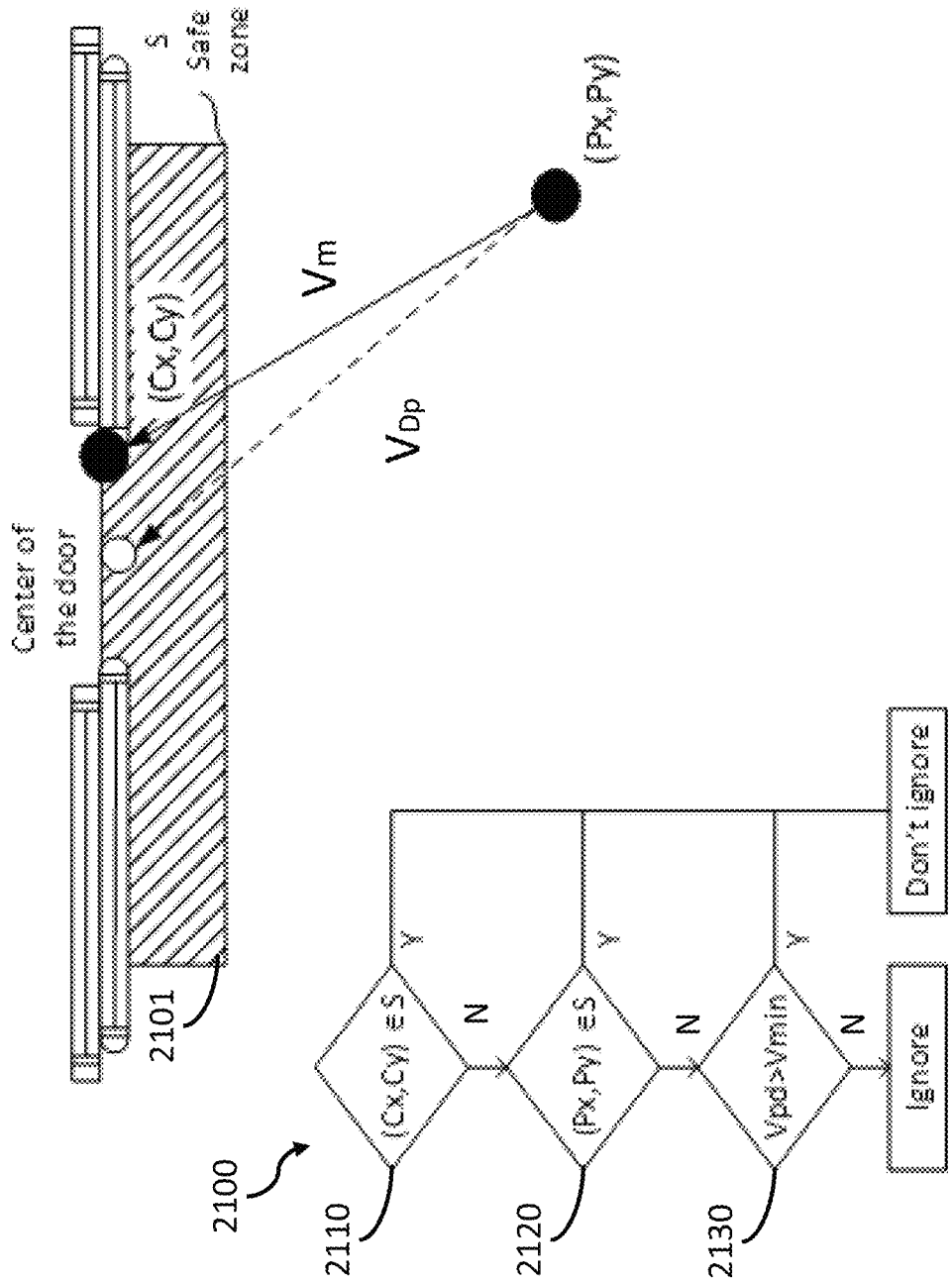
FIG. 21 is a flowchart of a method for identifying parallel traffic according to a possible implementation of the present disclosure.

FIG. 21 is a flowchart of a method for identifying parallel traffic according to a possible implementation of the present disclosure. The method 2100 may be implemented by a parallel traffic identifier 1531 (i.e., parallel traffic filter) as described previously. The method 2100 includes defining a safe zone 2101 (S) in a door area. The safe zone 2101 is entered when a target is near the door. Targets not in the safe zone may be ignored because they are not likely to interact with the door. The safe zone (S) of a door area (e.g., combined door area) may include the threshold of the door and the door opening.

The method 2100 includes determining if a crossing point ($C_x$, $C_y$) is in the safe zone (S) 2110. If the crossing point is in the safe zone (S) then the target is not ignored (i.e., no ignore signal). The method 2100 further including determining if a location ($P_x$, $P_y$) of the target is in the safe zone (S) 2120. If the target is in the safe zone (S) then the target is not ignored (i.e., no ignore signal). The method 2100 further includes determining if a projected doppler speed ($V_{Dp}$) is above a threshold speed ($V_{min}$) 2130. If the target is above the threshold speed (i.e., minimum speed), then the target is not ignored. Otherwise, if none of the conditions are satisfied, then the target is ignored (i.e., ignore signal). In other words, if (i) the projected crossing point is not in the safe zone, (ii) the current position of the target is not in the safe zone, and (iii) the target speed is not above a minimum speed, then the target is classified as parallel traffic and an ignore signal is sent so that the door is not triggered to open/close based on the target.

Figure 22:
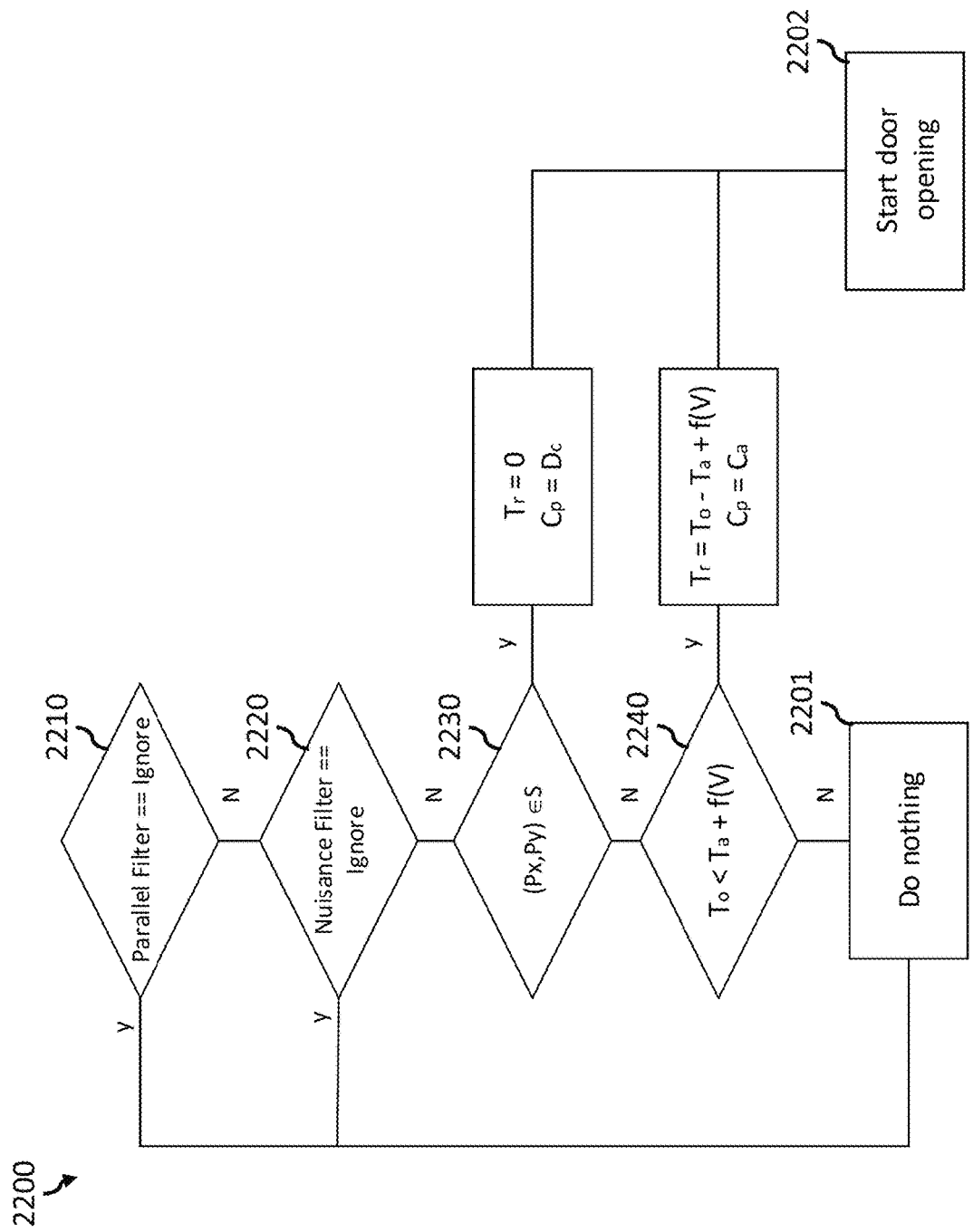
FIG. 22 is a flowchart of a method for controlling a door to open according to a possible implementation of the present disclosure.

FIG. 22 is a flowchart of a method 2200 for controlling a door to open according to a possible implementation of the present disclosure. Based on the output of the nuisance filter and the parallel traffic filter, the opening can be ignored completely. Accordingly, the method 2200 includes identifying parallel traffic 2210 and not opening (i.e., do nothing 2201) if a parallel traffic is identified. Additionally, the method 2200 includes identifying a nuisance 2220 and not opening (i.e., do nothing 2201) if a nuisance is identified. The method 2200 further includes determining 2230 if a location ($P_x$, $P_y$) of the target is in the safe zone (S). If the target is in the safe zone, then the door is triggered to open immediately. In other words, the door is triggered to open 2202 after no time (i.e., $T_r=0$). Additionally, the crossing point is set to the door center (i.e., $C_p=D_c$). The method 2200 further includes determining 2240 if a time needed to open the door ($T_o$) is less than the time it will take for a target to arrive ($T_a$) plus a safety margin (f(V)) that is based on a speed of the target (e.g., $V_m$, $V_{Dp}$). In this condition, the door is triggered to open 2202 after a time ($T_r$) that is the difference between the time to open ($T_o$) and the arrival time ($T_a$) (plus the safety margin) (i.e., $T_r=T_o-T_a+f(V)$). Additionally, the crossing point is set to the arrival crossing point (i.e., $C_p=C_a$). Alternatively, if the target is not in the safe zone (S) and the time to open is not less than the arrival time then the door may not be triggered to open 2201.

The three-dimensional tracking over a combined area provided by the disclosed approach can enable enhanced door control. The enhanced door control can include opening and closing based on object tracking and object classification (i.e., identification, filtering). In a possible implementation, the door may be controlled to not open for a child or animal based on height measurement. In another possible implementation, the door may be controlled to not open to a person walking near the door but not towards it. In another possible implementation the door may be controlled to partially open based on a computed size of the target. For example, a door opening may be based on the size of the target. In another example, a position of the door opening within the doorway may be based on a crossing point of the target. In another possible implementation, the door may be controlled to not close on a target identified as a human. For example, a breath movement may be identified in order to classify the target as a human. In another implementation, the door may be controlled based on an identified gesture from a target. For example, a motion may be identified as a gesture (e.g., hand waving) to open the door.

The enhanced door control can further include controlling a timing and/or speed of a door opening/closing based on tracking the target. In a possible implementation, the door may be controlled to open at a time corresponding to a time a target will arrive at the door. In another possible implementation, the door may be controlled to open at a rate that corresponds to a speed (i.e., velocity) of a target.

The mmW radar sensors may detect the door and its movement. For example, the mmW radar sensors may detect the left/right panels as the move in an out of the doorway. In a possible implementation, the sensing of the door panels may be used to replace or supplement the information about the door state provided by the door encoder 250. For example, combined mmW radar data may be processed to determine a state of the door (e.g., open, closed, percentage open, etc.). The state of the door may be used to determine an opening time, such as described in conjunction with FIG. 22. In another example, the combined mmW radar data may be processed to determine a motion of the door (e.g., door speed, door acceleration). The information about the motion of the door may be used to automatically diagnose a problem with the door. The diagnoses may automatically trigger a message that can be transmitted via the door interface. For example, a door moving slower than a threshold may trigger a repair notification that is transmitted to a technician via the door interface.

The present disclosure describes automatic door systems utilizing mmW radar sensors. However, the use of mmW radar sensors does not preclude an automatic door system from using data from other types of sensors as well. For example, the mmW radar door sensing described here may be combined with optical (i.e., visual) door sensing. One skilled in the art may recognize additional combinations and alternatives. For example, it is possible for mmW radar sensor data to be combined with other sensor data in a sensor fusion approach for door control. It is also possible for mmW radar sensors and other sensors to be used alternatively (i.e., switched). For example, door control may be switched (e.g., automatically switched) between sensing modalities as conditions dictate.

In the specification and/or figures, typical embodiments have been disclosed. The present disclosure is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

As used in this specification, a singular form may, unless definitely indicating a particular case in terms of the context, include a plural form. Spatially relative terms (e.g., over, above, upper, under, beneath, below, lower, and so forth) are intended to encompass different orientations of the device in use or operation in addition to the orientation depicted in the figures. In some implementations, the relative terms above and below can, respectively, include vertically above and vertically below. In some implementations, the term adjacent can include laterally adjacent to or horizontally adjacent to.

The invention claimed is:

1. An automatic door system comprising:
a door control unit (DCU) configured by instructions to:
receive millimeter wave (mmW) radar data from a plurality of mmW radar sensors, each of the plurality of mmW radar sensors sensing a different door area;
register the mmW radar data to sense a combined door area that includes each door area, wherein the mmW radar data includes a position of a target in the combined door area, the position expressed in three dimensions;
determine target information about the target in the combined door area based on the mmW radar data;
perform an analysis of the target information; and
control a door to open/close based on the analysis of the target information.

2. The automatic door system according to claim 1, wherein the analysis of the target information includes determining at least one of a height, a width, or a shape of the target.

3. The automatic door system according to claim 2, wherein the analysis of the target information further includes classifying the target as a human or animal based on the height, the width, or the shape.

4. The automatic door system according to claim 3, wherein the DCU is further configured by instructions to:
control the door to not open for the human or animal when the door is closed; and
control the door to not close on the human or animal when the door is open.

5. The automatic door system according to claim 2, wherein the DCU is further configured by instructions to:
control the door to open by an amount corresponding to the width of the target.

6. The automatic door system according to claim 1, wherein the analysis of the target information includes determining a speed of the target based on a first position of the target sensed at a first time and a second position of the target sensed at a second time.

7. The automatic door system according to claim 6, wherein the analysis of the target information further includes determining a time of arrival of the target at the door based on the speed.

8. The automatic door system according to claim 7, wherein the DCU is further configured by instructions to:
control the door to open after a period so that it is open at the time of arrival, the period based on a time to open the door determined by a door model and the time of arrival.

9. The automatic door system according to claim 6, wherein the DCU is further configured by instructions to:
control the door to open at a rate corresponding to the speed of the target.

10. The automatic door system according to claim 6, wherein the analysis of the target information includes estimating a direction of the target over time based on the first position and the second position.

11. The automatic door system according to claim 10, wherein the analysis of the target information further includes classifying the target as parallel traffic based on the direction of the target over time.

12. The automatic door system according to claim 11, wherein the DCU is further configured by instructions to:
control the door to not open for a target classified as parallel traffic.

13. The automatic door system according to claim 1, wherein the DCU is further configured by instructions to:
determine a position or a speed of the door based on the mmW radar data.

14. The automatic door system according to claim 1, wherein the DCU is further configured by instructions to:
recognize a gesture performed by the target based on the target information; and
control the door to open in response to the gesture.

15. The automatic door system according to claim 1, wherein the DCU is further configured by instructions to:
query a target database to determine that the target information corresponds to a previously recorded target; and
update the target database with the target information in order to track the target over time.

16. A method for controlling an automatic door, comprising:
capturing millimeter wave (mmW) radar data from a plurality of mmW radar sensors, each of the plurality of mmW radar sensors sensing a different door area;
registering the mmW radar data to sense a combined door area that includes each door area, wherein the mmW radar data includes a position of a target in the combined door area, the position expressed in three dimensions;
determining target information about the target in the combined door area based on the registered mmW radar data;
performing an analysis of the target information; and
controlling the automatic door to open/close based on the analysis of the target information.

17. The method for controlling an automatic door according to claim 16, wherein the registering the mmW radar data to sense the combined door area includes:
determining a position and an orientation of each of the plurality of mmW radar sensors relative to a reference coordinate system; and
converting the mmW radar data from each of the plurality of mmW radar sensors to the reference coordinate system based on the position and orientation.

18. The method for controlling an automatic door according to claim 17, further comprising:
determining baseline orientations for each of the plurality of mmW radar sensors relative to the reference coordinate system; and
detecting a change from the baseline orientation in one or more of the plurality of mmW radar sensors.

19. The method for controlling an automatic door according to claim 17, further comprising:
estimating a response of the automatic door to an input signal using a mathematical model of the automatic door; and
controlling the automatic door to open/close based on the analysis of the target information and the estimated response.

20. A method for controlling an automatic door, comprising:
capturing millimeter wave (mmW) radar data from a plurality of mmW radar sensors, each of the plurality of mmW radar sensors sensing a different door area;
registering the mmW radar data to sense a combined door area that includes each door area;
determining a crossing point of a target based on the registered mmW radar data;
determining a position of the target based on the registered mmW radar data;
determining a speed of the target based on the registered mmW radar data; and
ignoring the target if:
the crossing point is not in a portion of the combined door area designated as a safe zone, the safe zone including a threshold of the automatic door;
the position is not in the portion of the combined door area designated as the safe zone; and
the speed is not above a threshold speed.

21. The method for controlling an automatic door according to claim 20, further comprising:
determining a height of the target based on the registered mmW radar data; and
ignoring the target if the height is below a threshold.

22. An automatic door system comprising:
a door control unit (DCU) configured by instructions to:
receive millimeter wave (mmW) radar data from a plurality of mmW radar sensors, each of the plurality of mmW radar sensors sensing a different door area;
register the mmW radar data to sense a combined door area that includes each door area;
determine target information about a target in the combined door area based on the mmW radar data;
perform an analysis of the target information, wherein the analysis of the target information includes determining at least one of a height, a width, or a shape of the target; and
control a door to open/close based on the analysis of the target information.

* * * * *